United States Patent
Ikawa et al.

(10) Patent No.: US 10,414,261 B2
(45) Date of Patent: Sep. 17, 2019

(54) ANTIVIBRATION DEVICE

(71) Applicants: TOYO TIRE & RUBBER CO., LTD., Itami-shi, Hyogo (JP); TOYOTA JIDOSHA KABUSHIKI KAISHA, Toyota-shi, Aichi (JP)

(72) Inventors: Tatsuki Ikawa, Itami (JP); Nobuya Yoshida, Toyota (JP)

(73) Assignees: TOYO TIRE CORPORATION, Itami-shi, Hyogo (JP); TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 0 days.

(21) Appl. No.: 15/807,814

(22) Filed: Nov. 9, 2017

(65) Prior Publication Data

US 2018/0134136 A1 May 17, 2018

(51) Int. Cl.
*B60K 5/12* (2006.01)
*F16F 1/36* (2006.01)
(Continued)

(52) U.S. Cl.
CPC ............. *B60K 5/1208* (2013.01); *F16F 1/36* (2013.01); *F16F 1/3713* (2013.01); *F16F 13/10* (2013.01)

(58) Field of Classification Search
CPC ...... B60K 5/12; B60K 5/1208; B60K 5/1216; B60K 5/1225; B60K 5/1291; F16F 1/36;
(Continued)

(56) References Cited

U.S. PATENT DOCUMENTS

| 5,964,456 A | 10/1999 | Someya | |
|---|---|---|---|
| 2009/0026675 A1* | 1/2009 | Kanaya | F16F 1/3713 267/141 |

(Continued)

FOREIGN PATENT DOCUMENTS

| CN | 105339703 A | 2/2016 |
|---|---|---|
| JP | 2005-106138 A | 4/2005 |

(Continued)

OTHER PUBLICATIONS

Office Action dated Oct. 2, 2018, issued in counterpart Japanese Application No. 2016-224498, with English translation. (8 pages).

(Continued)

*Primary Examiner* — Robert A. Siconolfi
*Assistant Examiner* — San M Aung
(74) *Attorney, Agent, or Firm* — Westerman, Hattori, Daniels & Adrian, LLP

(57) ABSTRACT

An antivibration device capable of simplifying its manufacturing process with an antivibration base body being precompressed. A first attached member includes an upright portion upstanding toward a displacement restriction member, and when a second attached member is retained on a retainer member with an antivibration base body being precompressed, the interposition of the upright portion enables a space into which one side of a connecting member is insertable, to be formed between the first attached member and the displacement restriction member. Thus, after the completion of a step (for example, a press-fitting step) of retaining the second attached member of a mount body on the retainer member, the one side of the connecting member is inserted into the space between the first attached member and the displacement restriction member to be fixedly fastened to the first attached member.

16 Claims, 14 Drawing Sheets

(51) Int. Cl.
*F16F 1/371* (2006.01)
*F16F 13/10* (2006.01)

(58) Field of Classification Search
CPC .. F16F 1/371; F16F 1/373; F16F 1/376; F16F 1/3713; F16F 3/0873; F16F 7/108
USPC .......................................................... 267/141
See application file for complete search history.

(56) References Cited

U.S. PATENT DOCUMENTS

| | | | | |
|---|---|---|---|---|
| 2009/0079116 | A1* | 3/2009 | Yoshii | B60K 5/1291 267/140.13 |
| 2012/0267186 | A1* | 10/2012 | Hermann | B60K 5/1208 180/382 |
| 2015/0345583 | A1* | 12/2015 | Ishikawa | F16F 3/0873 248/634 |
| 2018/0266513 | A1 | 9/2018 | Abe et al. | |

FOREIGN PATENT DOCUMENTS

| | | |
|---|---|---|
| JP | 2008-128410 A | 6/2008 |
| JP | 2011-220434 A | 11/2011 |
| JP | 2012-102761 A | 5/2012 |
| JP | 2015-94401 A | 5/2015 |

OTHER PUBLICATIONS

Office Action dated Oct. 2, 2018, issued in Japanese Application No. 2016-224496 (Counterpart to U.S. Appl. No. 15/807,870; with English translation. (7 pages).
Office Action dated Oct. 2, 2018, issued in Japanese Application No. 2016-224497 (Counterpart to U.S. Appl. No. 15/807,847; with English translation. (7 pages).
U.S. Appl. No. 15/807,847, filed Nov. 9, 2017.
U.S. Appl. No. 15/807,870, filed Nov. 9, 2017.
Non-Final Office Action dated Jan. 4, 2019, issued in U.S. Appl. No. 15/807,847. (23 pages).
Office Action dated Apr. 28, 2019, issued in CN application No. 201711051802.5 (counterpart to U.S. Appl. No. 15/807,847: with English translation. (8 pages).
Office Action dated Mar. 4, 2019, issued in counterpart CN application No. 201711032053.1, with English translation. (8 pages).
Office Action dated Mar. 4, 2019, issued in CN application No. 201711035582.7 (counterpart to U.S. Appl. No. 15/807,870; with English translation. (10 pages).

* cited by examiner

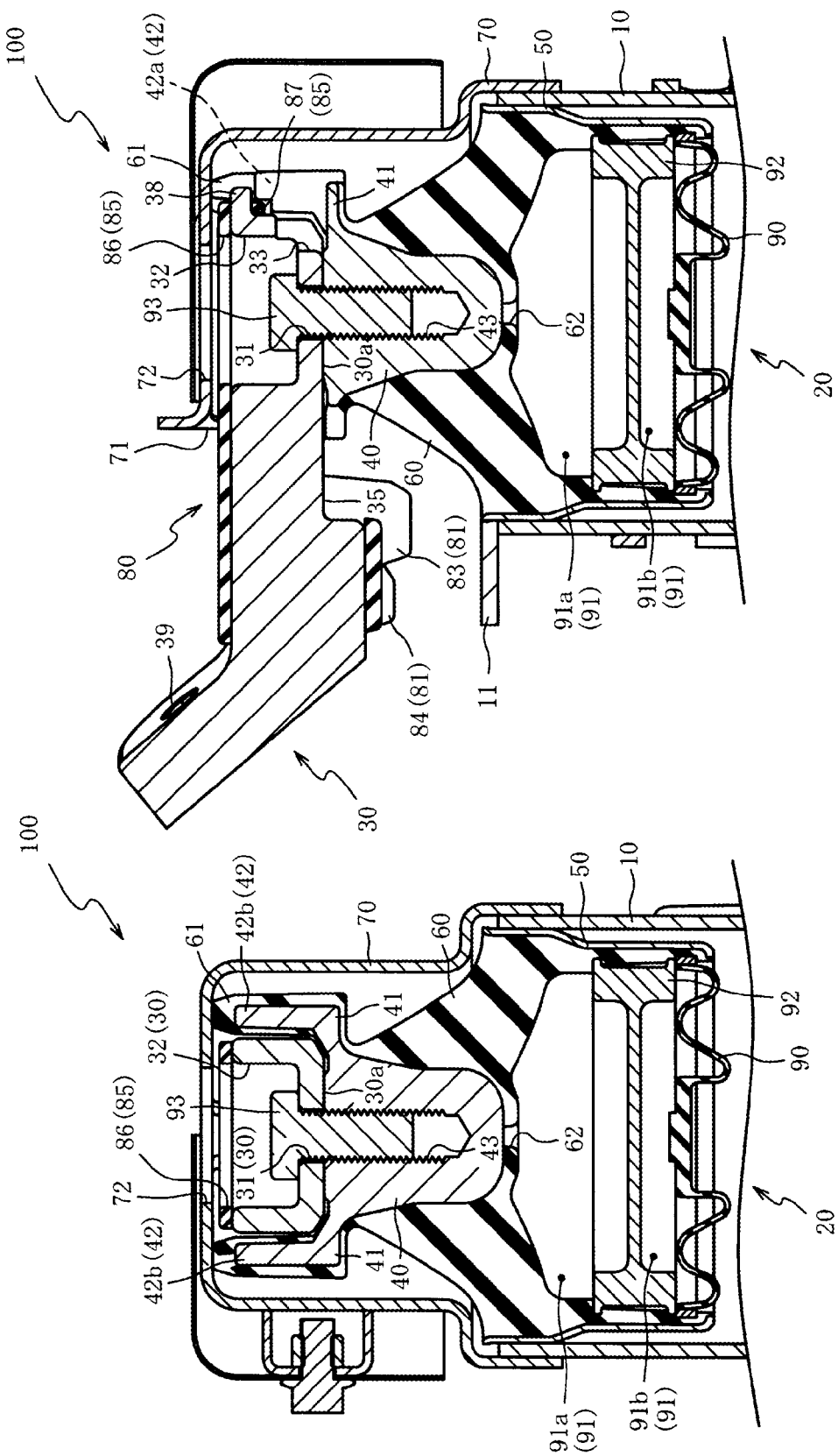

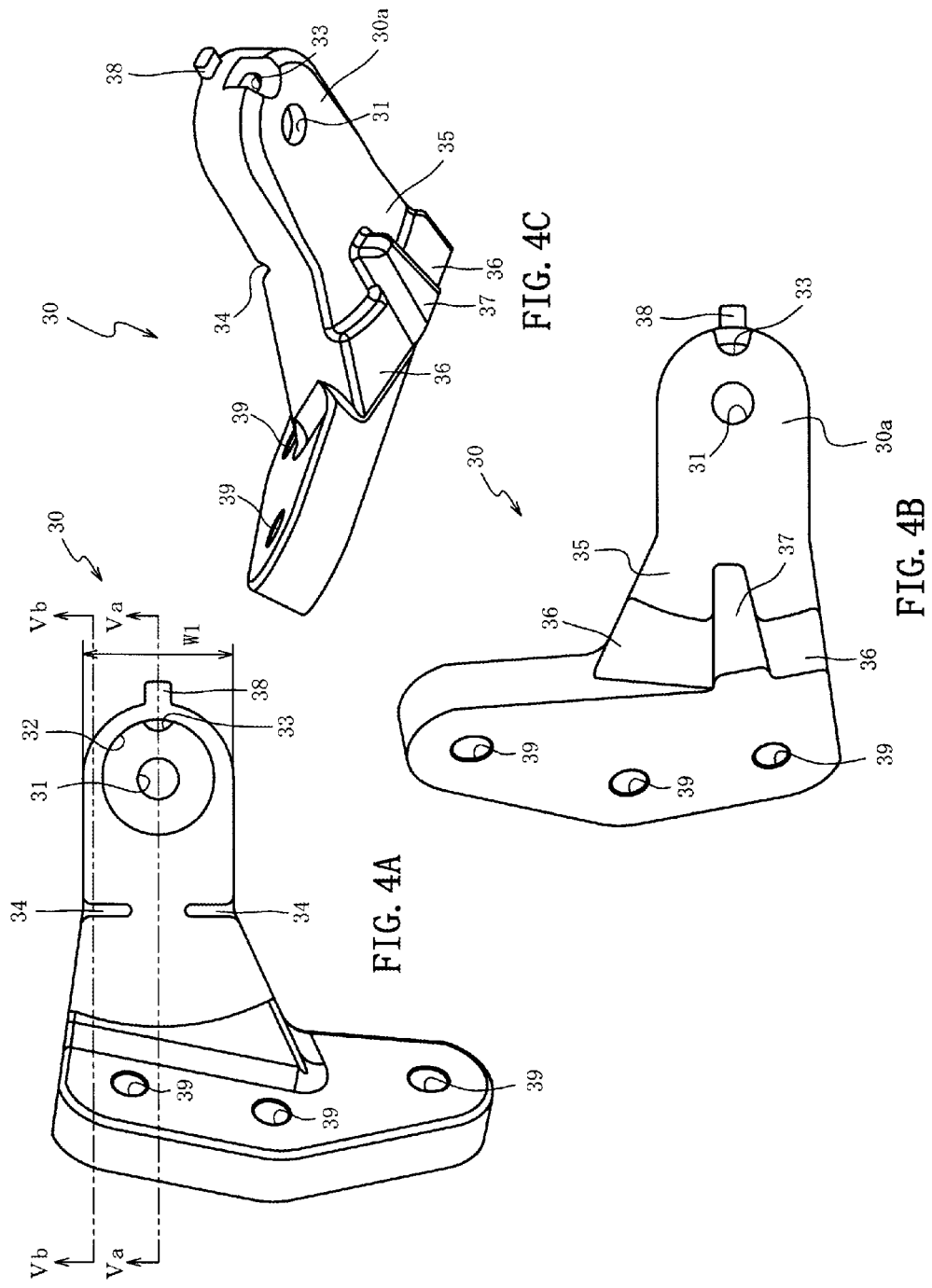

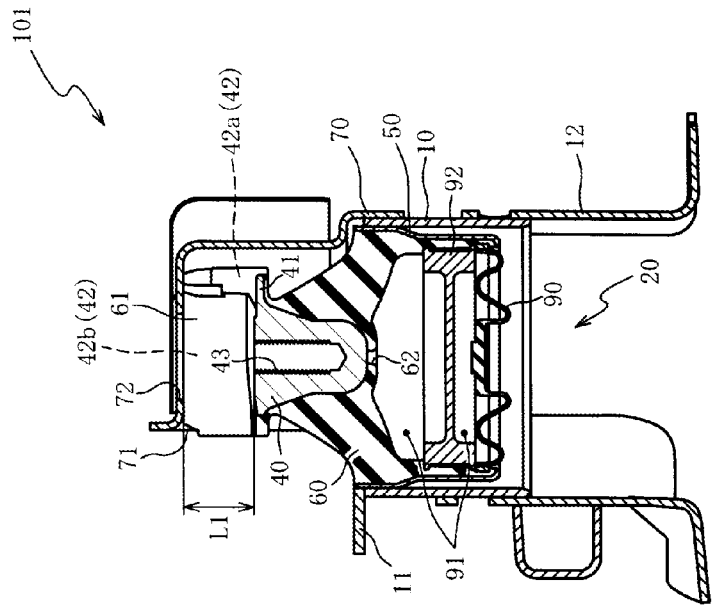
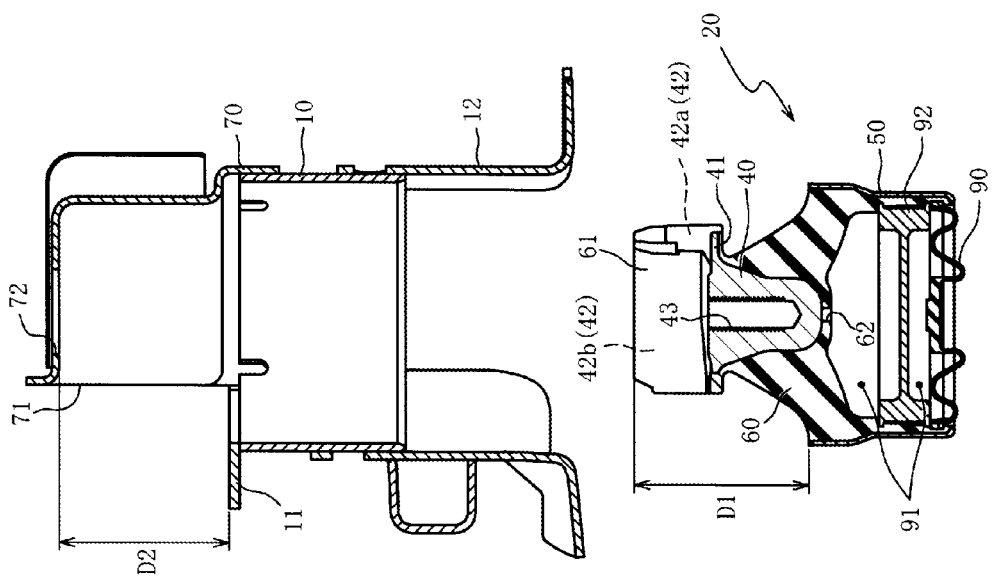
FIG. 10A
FIG. 10B

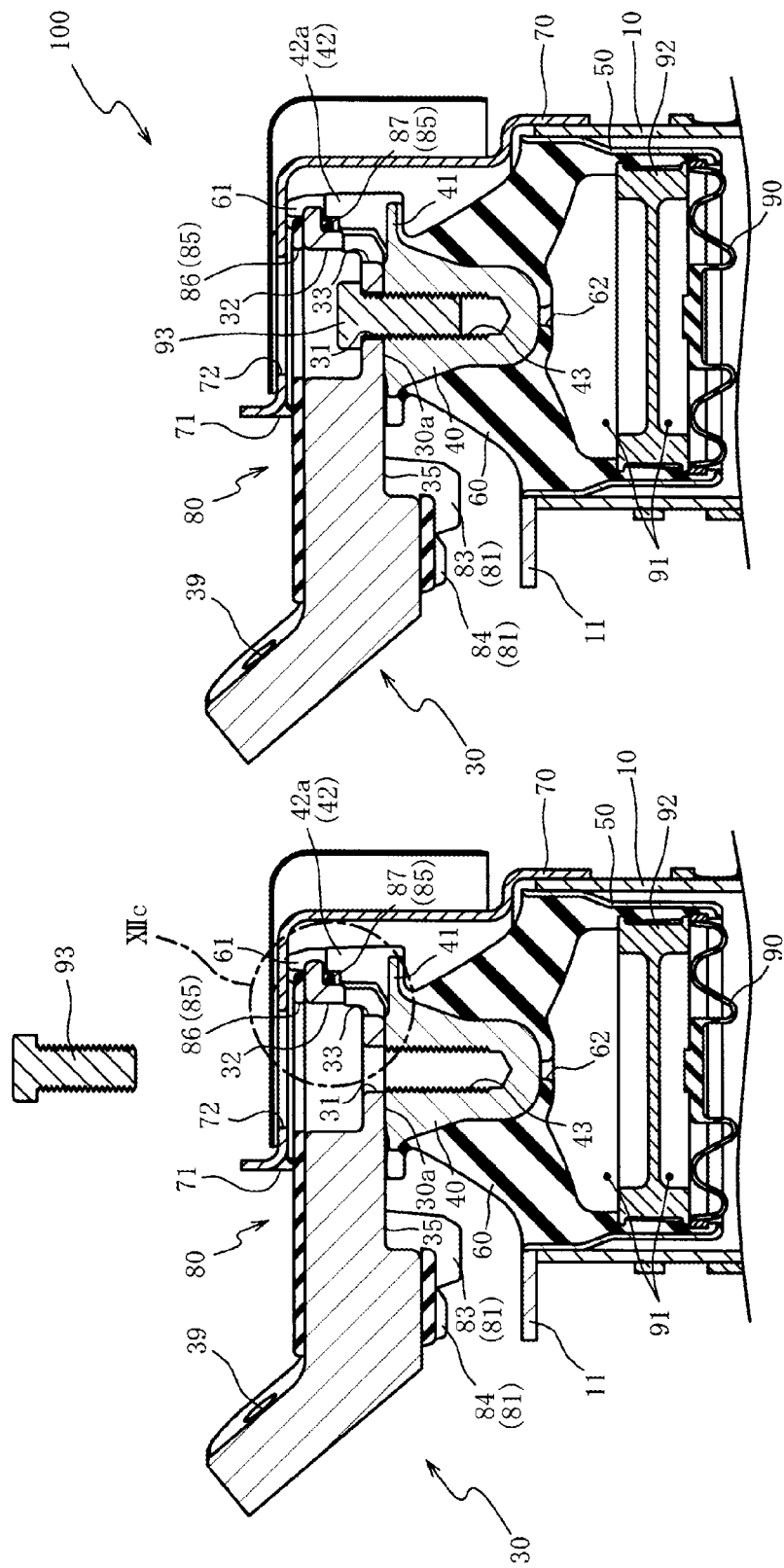

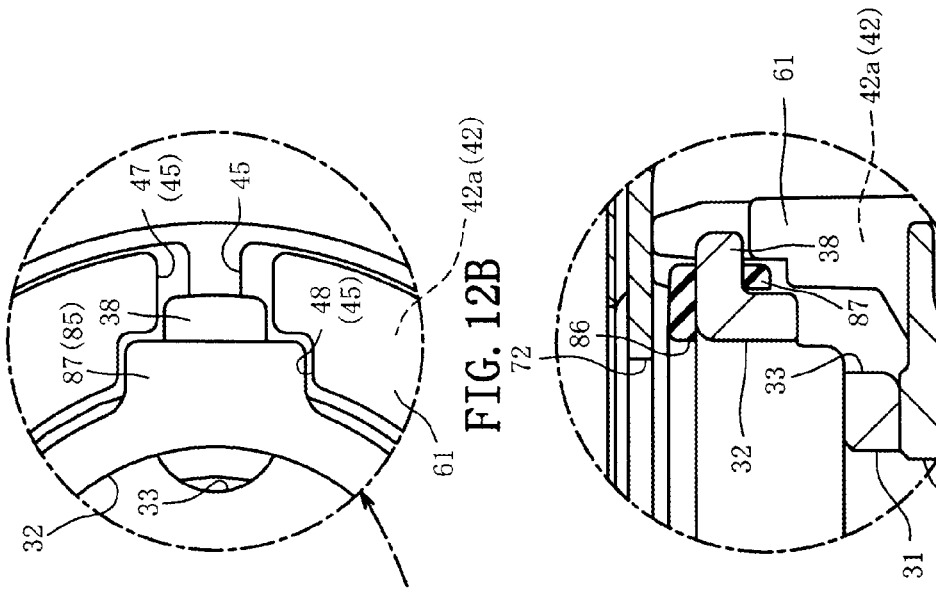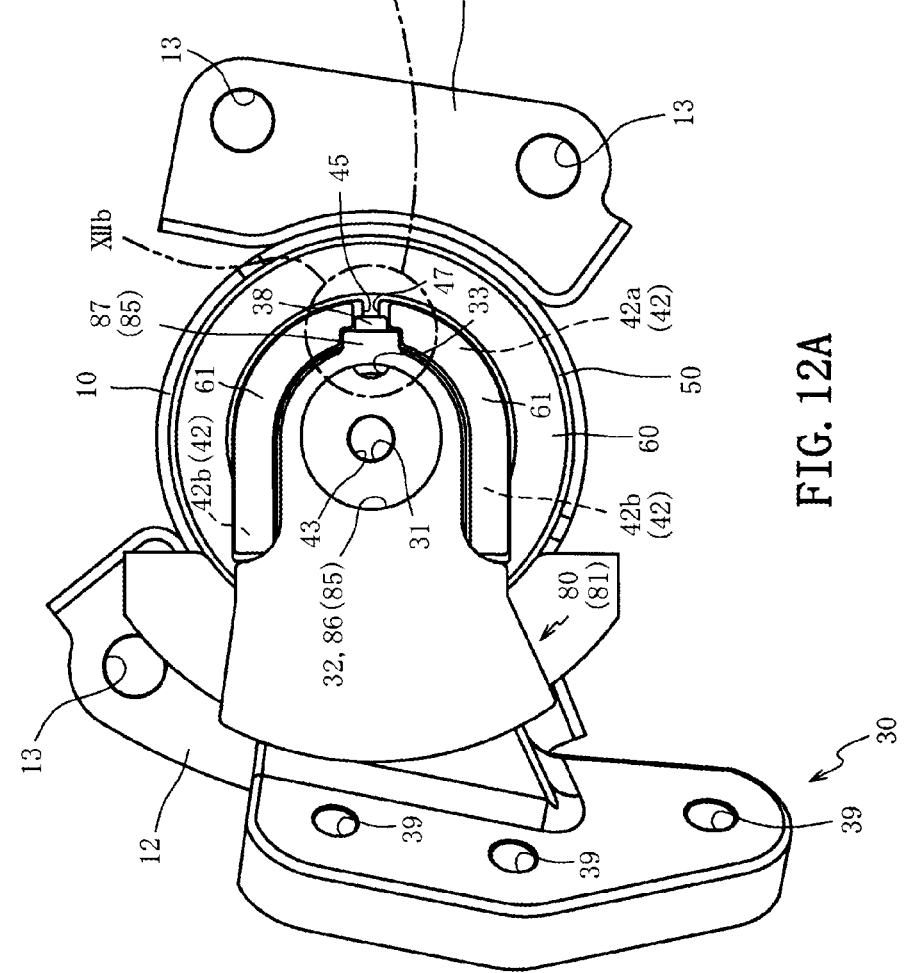

ANTIVIBRATION DEVICE

TECHNICAL FIELD

The present invention relates to an antivibration device and particularly to, an antivibration device capable of simplifying its manufacturing process with an antivibration base body being precompressed.

BACKGROUND ART

As antivibration devices used in motorcars, Patent Literature 1 discloses one including a mount body having a first attached member attached to a vibration source side, a second attached member attached to a vehicle body frame side, and an antivibration base body formed of a rubber-like elastic body and interconnecting the first attached member and the second attached member, a connecting member fixedly fastened to the first attached member on one side and fixedly fastened to the vibration source side on the other side, a retainer member retaining the second attached member, and a displacement restriction member disposed on the retainer member and surrounding one side of the connecting member, the displacement restriction member being famed with an inner fitting portion which enables a bolt to be inserted for fixedly fastening the connecting member to the first attached member.

According to this antivibration device, when displacement of a large amplitude is inputted in a rebound direction (a direction in which the first attached member goes away from the second attached member), the displacement restriction member catches the connecting member and a stopper rubber to operate as a stopper, so that an excessive displacement is restricted.

In this case, in the assembling of the antivibration device, first of all, the second attached member of the mount body interconnecting the first attached member and the second attached member by the antivibration base body is press-fitted to a first position relative to the retainer member with the displacement restriction member disposed thereon, and the connecting member is inserted between the displacement restriction member and the first attached member of the mount body. Subsequently, the second attached member of the mount body is further press-fitted relative to the retainer member to a second position to compress the antivibration base body by a predetermined amount in the axial direction. Thus, it is possible to assemble the antivibration device with the antivibration base body being precompressed.

CITATION LIST

Patent Literature

[Patent Literature 1] JP-A No. 2008-128410 (paragraph 0037, FIG. 4 and the like, for example)

SUMMARY OF INVENTION

Technical Problem

However, in the antivibration device of the aforementioned related art, there arises a problem in the following respect. That is, when the second attached member of the mount body is press-fitted to the second position relative to the retainer member, it becomes unable to insert the connecting member between the displacement restriction member and the first attached member of the mount body. Thus, press-fittings of two steps are required to be done wherein the press-fitting is discontinued at the first position and is again performed to the second position after the connecting member is inserted between the displacement restriction member and the first attached member of the mount body. As a consequence, the manufacturing process becomes complicated.

The present invention has been made in order to address the aforementioned problem, and an object of the present invention is to provide an antivibration device capable of simplifying its manufacturing process with an antivibration base body being precompressed.

Solution to Problem and Advantageous Effects of Invention

According to an antivibration device described in a first aspect, a first attached member includes an upright portion upstanding toward a displacement restriction member, and when a second attached member is retained on a retainer member with an antivibration base body being precompressed, the interposition of the upright portion enables a space into which one side of a connecting member is insertable, to be formed between the first attached member and the displacement restriction member. Thus, after the completion of a step (for example, a step of press-fitting) for retaining the second attached member of the mount body on the retainer member, the one side of the connecting member can be fixedly fastened to the first attached member by being inserted into the space between the first attached member and the displacement restriction member. Therefore, because the press-fittings of two steps are not required to be done as is required in the prior art device, it is possible to simplify the manufacturing process with the antivibration base body being precompressed.

According to the antivibration device described in a second aspect, there is provided a covering rubber portion formed of a rubber-like elastic body and provided to cover at least an upright end surface of the upright portion. Thus, when the displacement restriction member catches the displacement of the upright portion in the rebound direction to operate as a stopper, a shock absorbing effect can be obtained through the deformation of the covering rubber portion. Therefore, in addition to the effect achieved by the antivibration device described in the first aspect, it is unnecessary to provide the displacement restriction member with a rubber-like elastic body, and the covering rubber portion is connected to the antivibration base body, so that the structure can be simplified.

Incidentally, where the covering rubber portion is provided to also cover an outer surface of the upright portion, a shock absorbing effect can be obtained when, for example, the displacement restriction member catches the displacement of the upright portion in the vehicle front-rear direction or the vehicle right-left direction to operate as a stopper.

According to the antivibration device described in a third aspect, since in the state that the connecting member is fixedly fastened to the first attached member on one side, a gap between the upright portion and the displacement restriction member is set to a larger dimension than a gap between the connecting member and the displacement restriction member, it is possible to make the connecting member mainly undertake a load exerted when the displacement restriction member catches the displacement in the rebound direction to operate as a stopper. Therefore, in addition to the effect achieved by the antivibration device described in the first aspect, the damage of the upright portion can be suppressed, and hence, the upright portion can take a shape being relatively low in rigidity.

According to the antivibration device described in a fourth aspect, the upright portion is equipped with an abutting wall on which an insertion distal end side of the connecting member inserted into the space between the first attached member and the displacement restriction member is brought in abutment, and when the insertion distal end side of the connecting member is brought into abutment on the abutting wall, the connecting member is disposed at a position at which the connecting member is able to be fastened relative to the first attached member. Thus, in addition to the effect achieved by the antivibration device described in the first aspect, it becomes possible to position the connecting member easily relative to the first attached member.

Further, according to the fourth aspect, the upright portion (abutting wall) can play both of a role of forming between the first attached member and the displacement restriction member a space into which the connecting member is insertable, and another role of performing the positioning of the connecting member in the insertion direction. Thus, since members for both of these roles are unnecessary to be provided separately, the structure can be simplified by this degree.

According to the antivibration device described in a fifth aspect, there are provided a protrusion protruding from one of the insertion distal end side of the connecting member and the abutting wall and a receiving portion formed on the other of the insertion distal end side of the connecting member and the abutting wall and engaged with the protrusion by receiving the same. When the protrusion is received by the receiving portion, the connecting member is positioned relative to the first attached member. Therefore, in addition to the effect achieved by the antivibration device described in the fourth aspect, it is possible to heighten the accuracy of the position at which the connecting member is fixedly fastened relative to the first attached member. Further, in fixedly fastening the connecting member to the first attached member, these first attached member and connecting member can be restrained from being relatively rotated by the fastening torque.

Further, when the insertion distal end side of the connecting member is brought to abut on the abutting wall, the protrusion can be received in the receiving portion. Thus, it is possible to easily perform the insertion operation of the protrusion into the receiving portion, and it is possible to simultaneously perform an operation to insert the connecting member into a predetermined insertion position and another operation to insert the protrusion into the receiving portion. Therefore, the manufacturing process can be simplified by this degree.

According to the antivibration device described in a sixth aspect, the upright portion includes a pair of facing walls disposed to face lateral surfaces of the connecting member inserted into the space between the first attached member and the displacement restriction member. Thus, it is possible to regulate the insertion direction because the connecting member is inserted along the facing walls. Therefore, in addition to the effect achieved by the antivibration device described in the fifth aspect, it becomes possible to enable the receiving portion to receive the protrusion easily, and hence, the manufacturing process can be simplified by this degree.

According to the antivibration device described in a seventh aspect, the upright portion has the abutting wall connected to the facing walls. Thus, in addition to the effect achieved by the antivibration device described in the sixth aspect, the upright portion can as a whole be enhanced in rigidity by this degree. That is, the rigidity of the upright portion can be effectively secured by the good use of a limited space around the connecting member.

According to the antivibration device described in an eighth aspect, there is provided a stopper rubber formed of a rubber-like elastic body and mounted on the connecting member, and a protrusion is protruded from the insertion distal end side of the connecting member. A receiving portion is formed on the abutting wall, and the stopper rubber includes a hook portion formed to be engageable with the protrusion. Therefore, in addition to the effect achieved by the antivibration device described in the fifth aspect, it is possible to restrain the stopper rubber from being turned up when the connecting member is inserted into the space between the first attached member and the displacement restriction member.

In particular, since the protrusion engaged with the hook portion is famed on the insertion distal end side of the connecting member, it is possible to effectively restrain the stopper rubber from being turned up or the hook portion from coming off the protrusion in connection with the insertion.

Further, since the hook portion is formed to be engageable with the protrusion, the protrusion is enabled to play both of the role of being engaged with the receiving portion and the role of being engaged with the hook portion, and thus, it is not necessary to provide a portion for engagement with the hook portion independently. Therefore, the structure can be simplified by this degree.

According to the antivibration device described in a ninth aspect, the hook portion is put between the connecting member and the abutting wall. Thus, it is possible to make the hook portion difficult to be displaced in a direction to release the engagement with the protrusion. Therefore, in addition to the effect achieved by the antivibration device described in the fifth aspect, it is possible to restrain the hook portion from coming off the protrusion.

BRIEF DESCRIPTION OF THE DRAWINGS

FIG. 2A is an enlarged fragmentary sectional view of the antivibration device taken along the IIa-IIa line in FIG. 1A, and FIG. 2B is an enlarged fragmentary sectional view of the antivibration device taken along the IIb-IIb line in FIG. 1A.

FIG. 4A is a plan view of a connecting member, FIG. 4B is a bottom view of the connecting member, and FIG. 4C is a perspective bottom view of the connecting member.

FIG. 10A is a sectional view of a retainer member, a displacement restriction member and the mount body, and FIG. 10B is a sectional view of a compact body.

FIG. 11A is an enlarged fragmentary sectional view of the antivibration device in the state before a bolt is fastened, and FIG. 11B is an enlarged fragmentary sectional view of the antivibration device in the state after the bolt is fastened.

FIG. 12A is a plan view of the antivibration device in the state that the displacement restriction member and the bolt are detached, FIG. 12B is an enlarged fragmentary view of the antivibration device at the XIIb portion in FIG. 12A, and FIG. 12C is an enlarged fragmentary sectional view of the antivibration device at the XIIc portion in FIG. 11A.

DESCRIPTION OF EMBODIMENTS

Figure 1A:
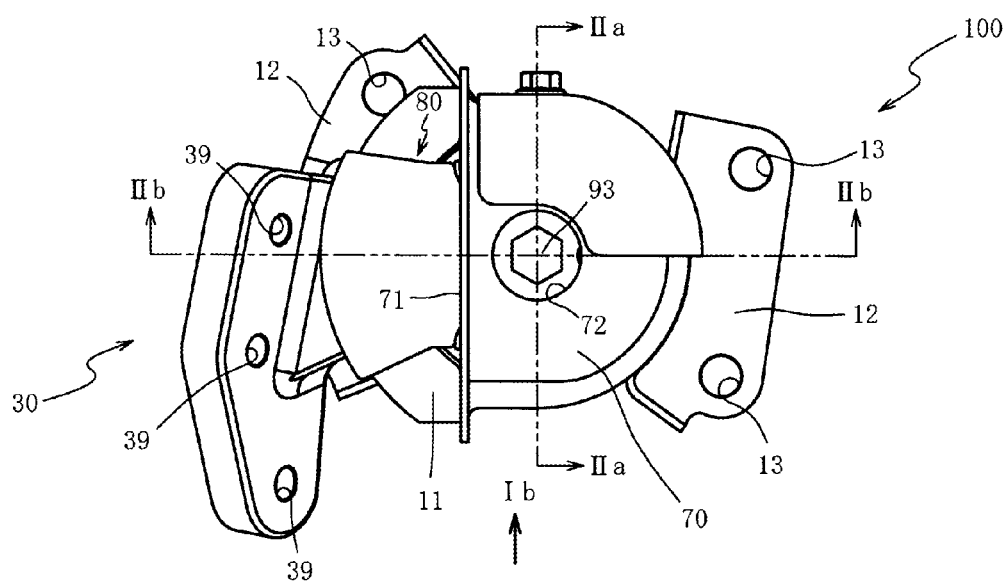
FIG. 1A is a plan view of an antivibration device in a first embodiment.
Figure 1B:
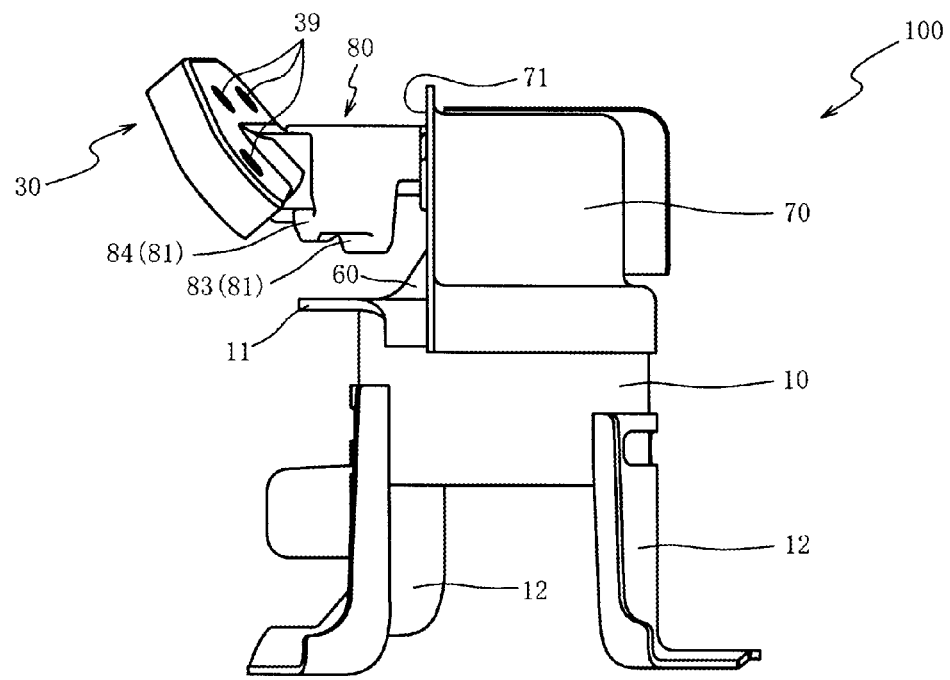
FIG. 1B is a side view of the antivibration device as viewed in the Ib direction in FIG. 1A.

Hereinafter, preferred embodiments of the present invention will be described with reference to the accompanying drawings. An antivibration device 100 in a first embodiment will be described with reference to FIG. 1. FIG. 1A is a plan view of the antivibration device 100 in the first embodiment, and FIG. 1B is a side view of the antivibration device 100 as viewed in the Ib direction in FIG. 1A.

As shown in FIG. 1, the antivibration device 100 is constituted by being provided mainly with a retainer member 10 fixedly retaining a mount body 20 referred to later, a displacement restriction member 70 disposed over the retainer member 10, a connecting member 30 coupled to an engine, a stopper rubber 80 disposed to surround the outer periphery of the connecting member 30, and a stopper wall portion 11 located under the stopper rubber 80 and formed to be connected to the retainer member 10.

The retainer member 10 is a sleeve-like member disposed with the axis directed vertically and is provided at an outer peripheral surface with a plurality of brackets 12 connectable to a vehicle body.

The brackets 12 are hung down from respective one sides connected to the retainer member 10 and are famed to have respective other sides bent radially outward of the retainer member 10. The brackets 12 are each famed at the other side with two through holes 13 piercing vertically. The antivibration device 100 is attached to the vehicle body by being connected by bolts not shown and the like through the through holes 13.

The displacement restriction member 70 is a portion which, when the antivibration device 100 is displaced in a rebound direction (the direction in which the connecting member 30 moves upward in FIG. 1B), operates as a stopper for restraining the displacement by interfering with the connecting member 30 through the stopper rubber 80 referred to later. The displacement restriction member 70 is a metal fitting disposed on an upper end portion of the retainer member 10 to cover the upper end of the retainer member 10. The displacement restriction member 70 is famed with an opening 71 opening in a radially outward direction (on the left side in FIG. 1B) in which the connecting member 30 is disposed, and is also formed with a circular insertion hole 72 through which a head portion of a bolt 93 for connecting the connecting member 30 to a first attached member 40 is able to pass.

The connecting member 30 is a casting made of an aluminum alloy, is inserted from the opening 71 of the displacement restriction member 70 on one side and is threadedly engaged by the bolt 93 with the first attached member 40 of the mount body 20 described later.

The stopper rubber 80 is a rubber-like elastic body mounted on the one side of the connecting member 30 and is arranged at least on an upper surface of the connecting member 30 facing the displacement restriction member 70 and a lower surface of the connecting member 30 facing the stopper wall portion 11.

The stopper wall portion 11 is a plate-like member famed radially outward from an upper end portion of the retainer member 10 and is disposed to face a bottom surface of the stopper rubber 80. Thus, when the antivibration device 100 is displaced in the bound direction (the direction in which the connecting member 30 moves downward in FIG. 1B), the stopper wall portion 11 operates as a stopper to restrain the displacement by interfering with the connecting member 30 through the stopper rubber 80.

Next, the mount body 20 will be described with reference to FIG. 2. FIG. 2A is an enlarged fragmentary sectional view of the antivibration device 100 taken along the IIa-IIa line in FIG. 1A, and FIG. 2B is an enlarged fragmentary sectional view of the antivibration device 100 taken along the IIb-IIb line in FIG. 1A.

As shown in FIG. 2A and FIG. 2B, the mount body 20 is constituted to mainly include the first attached member 40 to which the connecting member 30 is attached, a cylindrical second attached member 50 located under the first attached member 40 (the underside in FIG. 2A) and attached to the vehicle body side, an antivibration base body 60 made of a rubber-like elastic body and interconnecting the first attached member 40 and the second attached member 50, a diaphragm 90 provided on an inner peripheral side of a lower portion of the second attached member 50, and a partition body 92 disposed over the diaphragm 90 (the upper side in FIG. 2A).

The second attached member 50 is famed cylindrically and has an outside diameter on an upper end side (the upper side in FIG. 2A and FIG. 2B) formed to be almost the same as an inside diameter of the retainer member 10. The second attached member 50 is fitted in the retainer member 10 with an end surface on the upper end side being at almost the same position as an upper surface of the stopper wall portion 11. Thus, the mount body 20 is fixed inside the retainer member 10. Further, an outside diameter on the lower side of the second attached member 50 is formed to be smaller than the outside diameter on the upper end side.

The first attached member 40 is a boss fitting disposed on the upper side on the axis of the second attached member 50 and is formed into a cylindrical shape coaxial with the second attached member 50. The first attached member 40 is famed at an upper end surface (a seat surface on which the connecting member 30 abuts) with a receiving portion 41 extending radially outward, and the receiving portion 41 is famed with an upright portion 42 upstanding upward (upward in FIG. 2A) from a brim portion of the upper surface. Further, a female screw portion 43 with which the bolt 93 is threadedly engaged is formed from the upper surface of the first attached member 40 downward along the axis of the first attached member 40 formed like a round column.

The antivibration base body 60 is a rubber-like elastic body connecting the outer peripheral surface of the first attached member 40 with the inner peripheral surface of the second attached member 50. The antivibration base body 60 is continuously famed with a covering rubber portion 61 covering an inner surface, an outer surface and an upper end surface of the upright portion 42 of the first attached member 40.

The covering rubber portion 61 has the upper end surface being able to abut on an upper end bottom surface of the displacement restriction member 70. Thus, when the displacement takes place in the rebound direction (upward in FIG. 2A), the covering rubber portion 61 is defamed, so that a shock absorbing effect can be attained by the displacement restriction member 70 which catches the displacement of the upright portion 42 to operate as a stopper. Further, the covering rubber portion 61 is also arranged onto the outer peripheral surface of the upright portion 42, and thus, when the vehicle is displaced in a horizontal direction (the right-left direction in FIG. 2A and FIG. 2B), a shock absorbing effect can be attained by the displacement restriction member 70 which catches the displacement of the upright portion 42 to operate as a stopper.

The diaphragm 90 is a rubber-like elastic body famed into a wave shape in section and famed to an annular shape as viewed in the axial direction and is disposed at a lower-end opening of the second attached member 50. Thus, a liquid-sealed chamber 91 is famed between the diaphragm 90 and the antivibration base body 60. Incidentally, the shape as viewed in section of the diaphragm 90 may be, for example, a semicircular round shape or the like.

The partition body 92 is a plate-like member famed into a circular shape as viewed in the axial direction, is famed at an outer peripheral brim portion with a wall protruding on both sides in the axial direction, and is disposed over the diaphragm 90. Thus, the liquid-sealed chamber 91 is partitioned into a first chamber 91a on the upper side (the antivibration base body 60 side) and a second chamber 91b on the lower side (the diaphragm 90 side), and the both chambers 91a, 91b are in communication through an orifice. Incidentally, the partition body 92 may have a rubber membrane or a movable membrane arranged thereon.

Figure 3A:
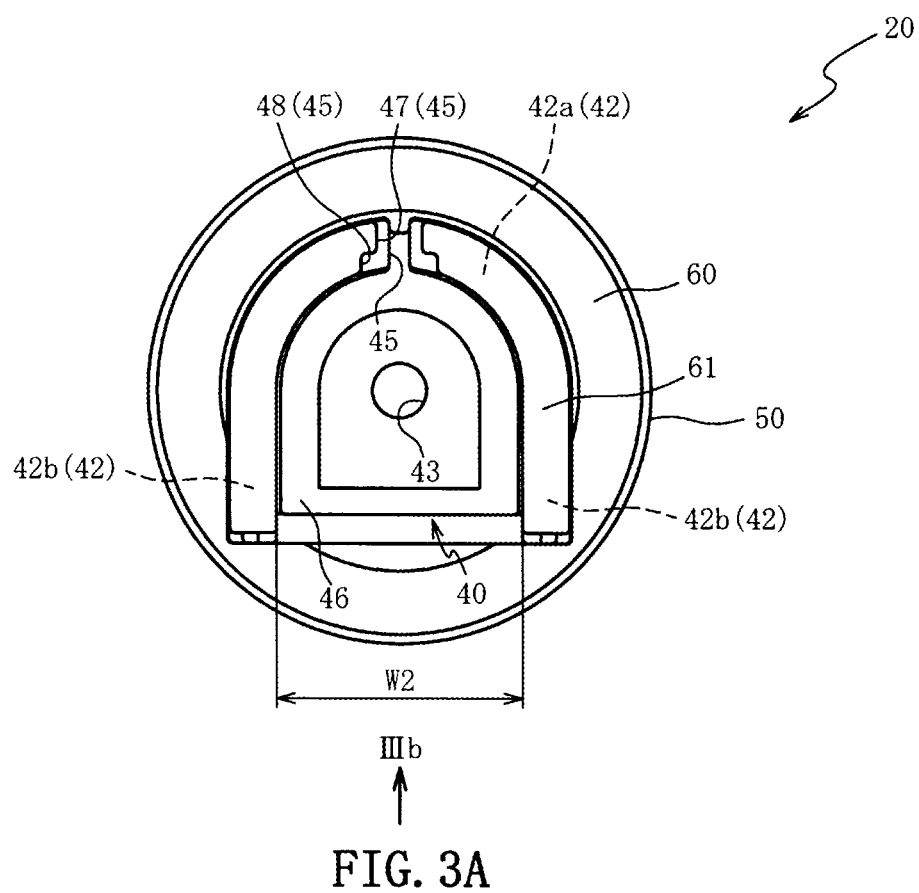
FIG. 3A is a plan view of a mount body.

Next, the antivibration base body 60 and the first attached member 40 will be described in detail with reference to FIG. 3. FIG. 3A is a plan view of the mount body 20, and FIG. 3B is a side view of the mount body 20 as viewed in the IIIb direction in FIG. 3A.

Figure 3B:
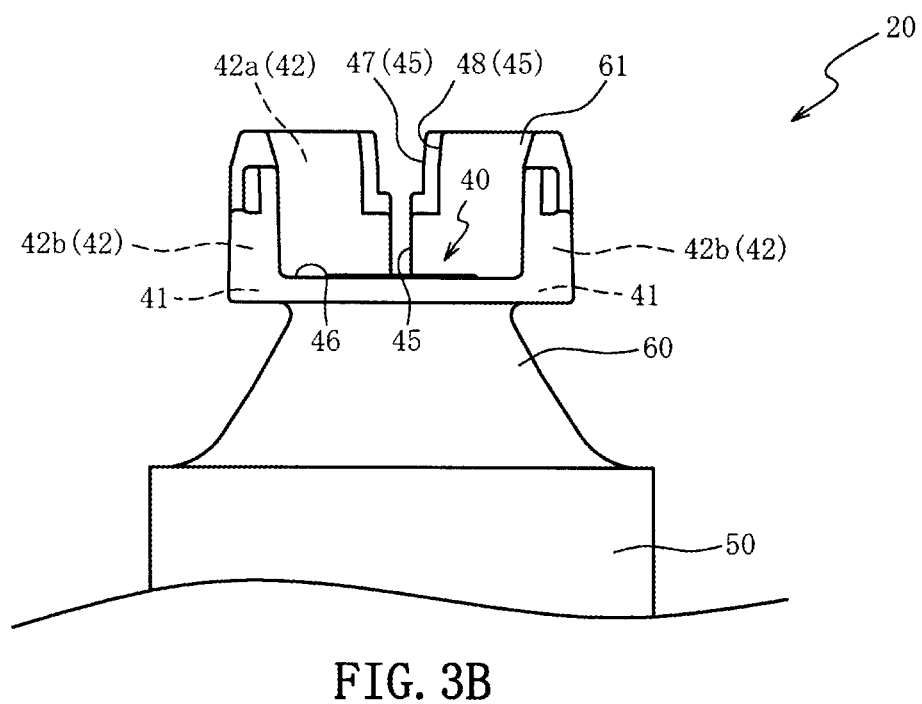
FIG. 3B is a side view of the mount body as viewed in the IIIb direction in FIG. 3A.

As shown in FIG. 3A and FIG. 3B, the upright portion 42 of the first attached member 40 is famed into an almost U-shape as viewed from above with an abutting wall 42a famed to be curved to an arc shape as viewed from above and a pair of facing walls 42b provided to continue with the abutting wall 42a and facing each other with a predetermined space therebetween. The abutting wall 42a is famed at a center portion in the circumferential direction with a slit-like receiving portion 45 opening from an axial upper end to a base portion (receiving portion 41). Incidentally, the upright portion 42 is covered with the covering rubber portion 61, and a face-to-face distance between the covering rubber portions 61 covered on the inside surfaces of the facing walls 42b of the upright wall portion 42 is set as a face-to-face distance dimension W2.

At the upper end surface (the seat surface on which the connecting member 30 abuts) of the first attached member 40, a drain channel 46 is famed to be almost flush with a base portion of the receiving portion 45, the drain channel 46 being famed to become depressed in the axial direction (the vertical direction in FIG. 3B) along the inner peripheral side of the upright portion 42. Thus, water collected inside the upright portion 42 can be drained from the receiving portion 45 outside the antivibration device 100 through the drain channel 46.

On the upper side of the receiving portion 45 (on the upper side in FIG. 3B), a first groove 47 is formed which opens radially outward of the abutting wall 42a to be wider than the receiving portion 45 in a direction perpendicular to the axis (the right-left direction in FIG. 3B), and on the radial inside, a second groove 48 is famed which opens radially inside to be wider than the first groove 47 in the direction perpendicular to the axis. With respect to the depths of the first groove 47 and the second groove 48 in the vertical direction (the vertical direction in FIG. 3B), the second groove 48 is famed to be deeper than the first groove 47.

Figure 5A:
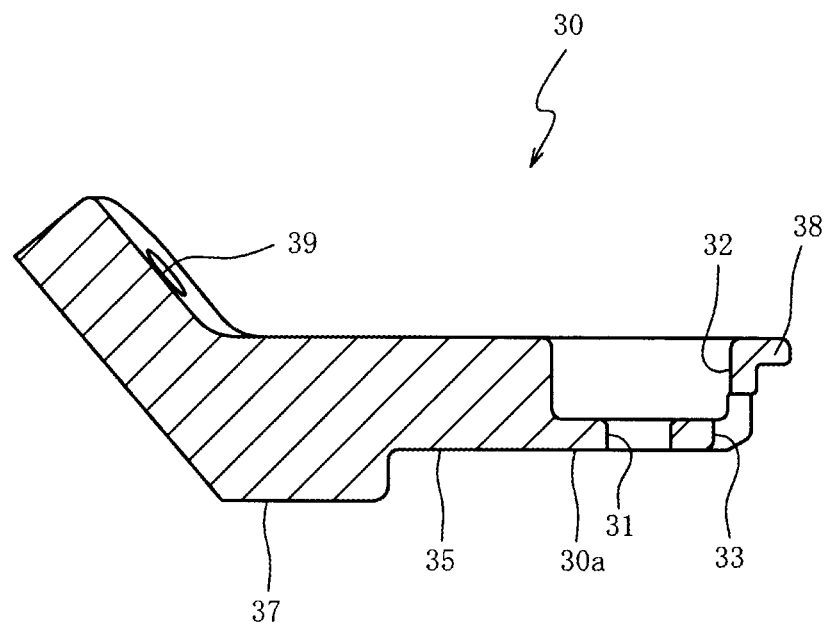
FIG. 5A is a sectional view of the connecting member taken along the Va-Va line in FIG. 4A.

Next, the details of the connecting member 30 will be described with reference to FIG. 4 and FIG. 5. FIG. 4A is a plan view of the connecting member 30, FIG. 4B is a bottom view of the connecting member 30, and FIG. 4C is a perspective bottom view of the connecting member 30. FIG. 5A is a sectional view of the connecting member 30 taken along the Va-Va line in FIG. 4A, and FIG. 5B is a sectional view of the connecting member 30 taken along the Vb-Vb line in FIG. 4A.

Figure 5B:
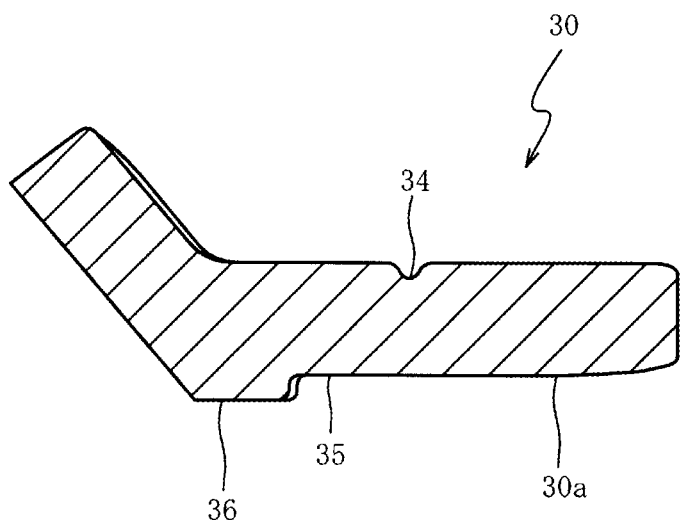
FIG. 5B is a sectional view of the connecting member taken along the Vb-Vb line in FIG. 4A.

As shown in FIG. 4 and FIG. 5, the connecting member 30 includes one side inserted inside of the opening 71 of the displacement restriction member 70 (refer to FIG. 1A and FIG. 2B) and the other side fastened to the engine, and in the present embodiment, these are famed into bent in an L-shape as viewed in section. An end portion on the one side of the connecting member 30 is formed to be a U-letter outer shape as viewed from above and takes almost the same shape as the inner peripheral side of the abutting wall 42a of the upright portion 42 of the first attached member 40 as viewed from above. The end portion on the one side of the connecting member 30 is famed at a bottom surface (the lower surface in FIG. 5A and FIG. 5B) with an abutting surface 30a which abuts on the upper surface of the first attached member 40. The dimension W1 in the width direction on the one side of the connecting member 30 is set to a dimension equivalent to or a slightly smaller dimension than the face-to-face distance dimension W2 (refer to FIG. 3A) of the aforementioned facing walls 42b of the first attached member 40 (W1<W2).

The one side of the connecting member 30 is famed with a fastening hole 31 piercing vertically along the axis of the arc of a curved portion which is formed to take a U-shape curve as viewed from above. Around the fastening hole 31, a receiving recess 32 is famed annularly as viewed from above to be depressed like a concavity from an upper surface side (from the viewer's side in FIG. 4A) toward a lower side. The receiving recess 32 receives the head portion of the bolt 93 which fastens the connecting member 30 and the first attached member 40 through the fastening hole 31, and thus, the head portion of the bolt 93 can be prevented from protruding upward beyond the upper surface of the connecting member 30. That is, the receiving recess 32 is set to be deeper in depth dimension than the height dimension of the head portion of the bolt 93 and is set to be larger in diameter than the diametric dimension of the head portion of the bolt 93.

On a distal end side (the right side in FIG. 4A) of the one side of the connecting member 30, the receiving recess 32 is formed at an edge portion with a communication aperture 33 making the interior space of the receiving recess 32 communicate with the outside. Thus, water collected in the receiving recess 32 can be drained outside.

A protrusion 38 is formed protruding from a distal end of the curved portion on the one side of the connecting member 30. The protrusion 38 is a portion for holding the stopper rubber 80 in engagement with a hook portion 87 of the stopper rubber 80, and the protrusion 38 of the connecting member 30 is famed to be almost flush with the upper end surface. Therefore, since the communication aperture 33 is formed closely to the position whose rigidity is increased by the provision of the protrusion 38, the connecting member 30 can be restrained from being lowered in rigidity by the provision of the communication aperture 33.

On both lateral surfaces being at almost a center of the extending direction (the right-left direction in FIG. 4A) of the one side, the connecting member 30 is famed with engagement recesses 34 depressed downward from the upper surface side. The engagement recesses 34 are formed to extend inward from the both lateral surfaces in a direction perpendicular to the extending direction of the one side of the connecting member 30.

The connecting member 30 is formed at the bottom surface on the one side with a receding surface 35 formed to be almost flush with the abutting surface 30a which abuts on the upper surface of the first attached member 40, a base surface 36 formed between the one side and the other side of the connecting member 30 and formed to protrude downward beyond the receding surface 35, and an extending protrusion 37 protruding downward from the receding surface 35 and the base surface 36 and extending in the longitudinal direction of the one side of the connecting member 30. In the present embodiment, the connecting member 30, when viewed from the bottom, is formed to take almost a triangle shape with its distal end side on the one side becoming a protruding shape, and thus, the fitting property (the insertion property) into the stopper rubber 80 can be improved. However, the extending protrusion 37 may be an almost rectangular shape as viewed from the bottom.

Further, on the other end side, the connecting member 30 is famed at least one place (three places in the present embodiment) with attaching holes 39 for fixed fastening on the engine and is fixedly fastened by bolts not shown on the engine side.

Figure 6A:
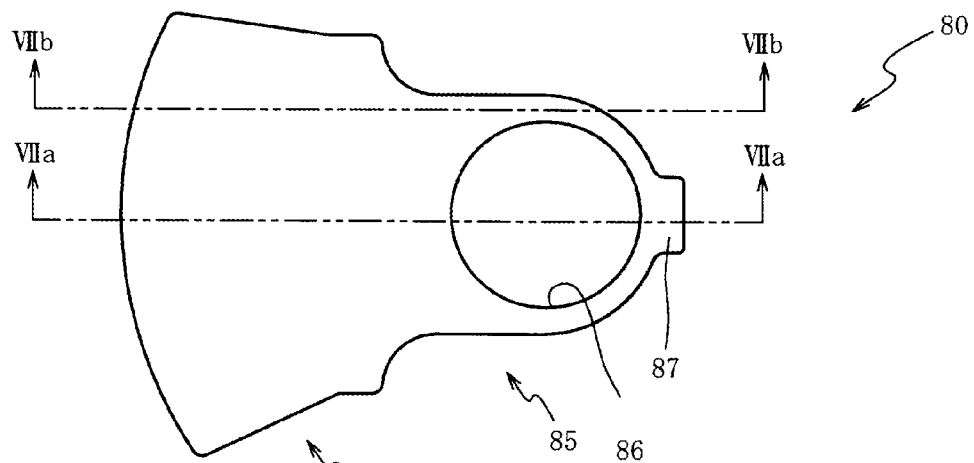
FIG. 6A is a plan view of a stopper rubber.
Figure 6B:
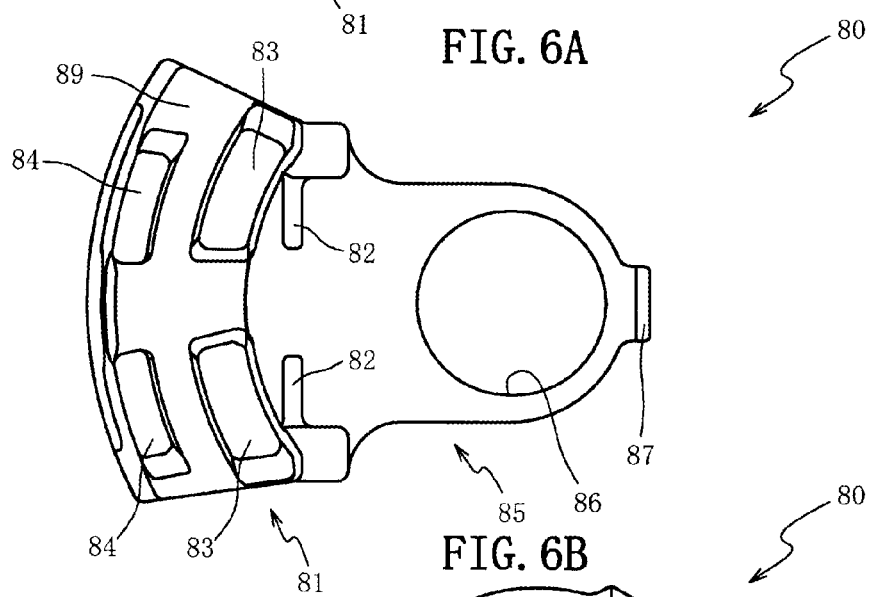
FIG. 6B is a bottom view of the stopper rubber.
Figure 6C:
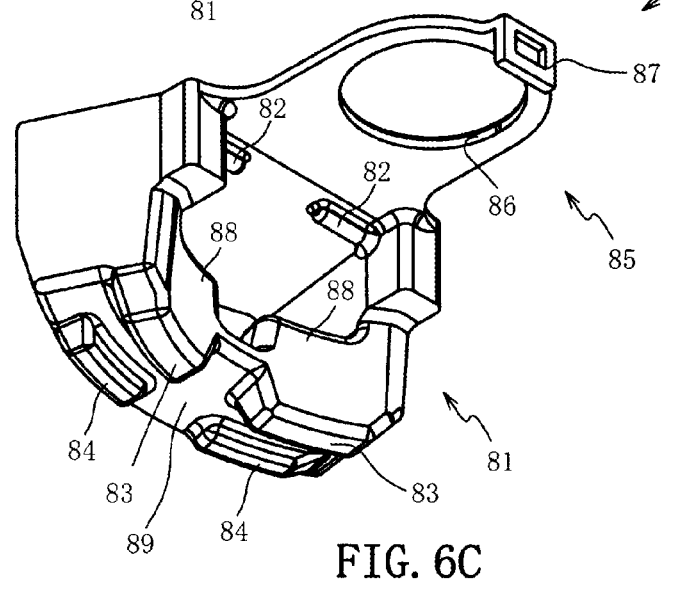
FIG. 6C is a perspective bottom view of the stopper rubber.
Figure 7A:
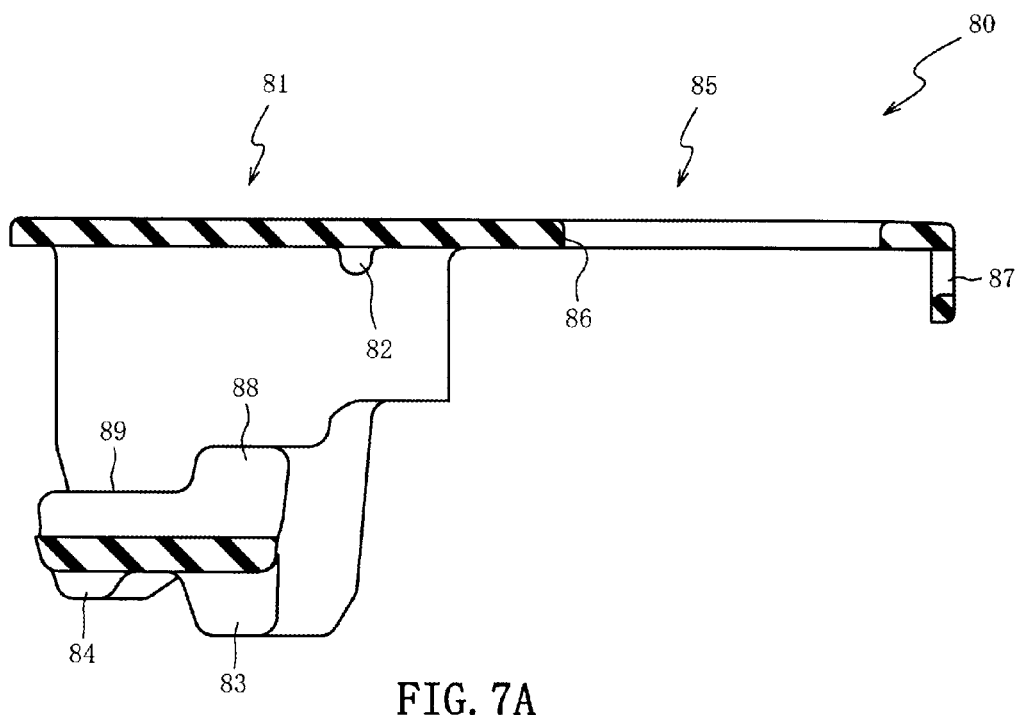
FIG. 7A is a sectional view of the stopper rubber taken along the VIIa-VIIa line in FIG. 6A.
Figure 7B:
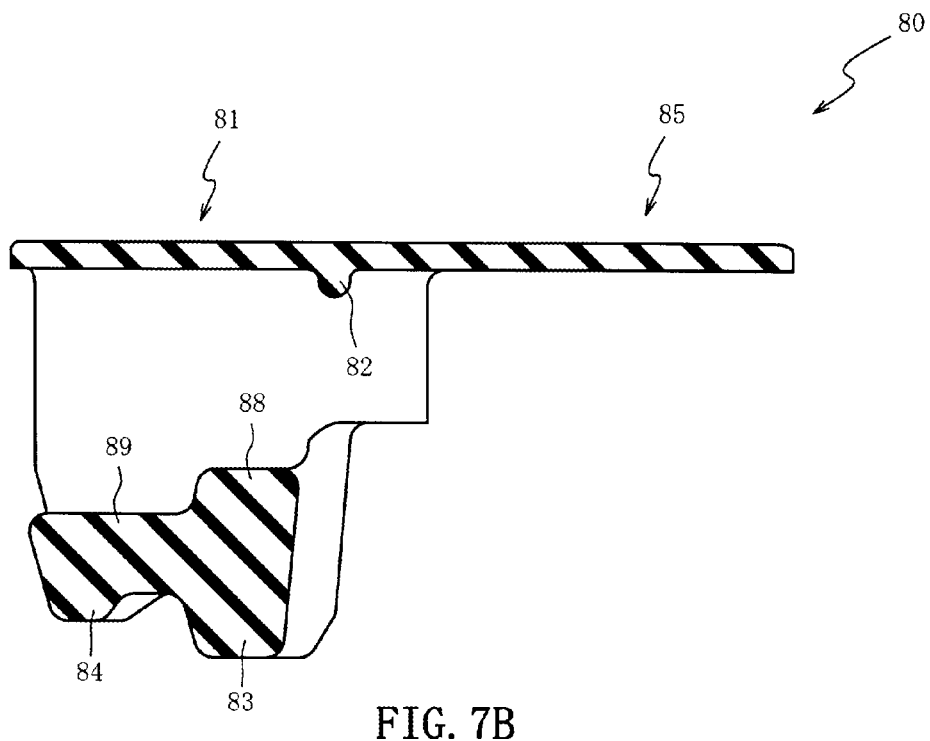
FIG. 7B is a sectional view of the stopper rubber taken along the VIIb-VIIb line in FIG. 6A.

Next, the stopper rubber 80 will be described in detail with reference to FIG. 6 and FIG. 7. FIG. 6A is a plan view of the stopper rubber 80, FIG. 6B is a bottom view of the stopper rubber 80, and FIG. 6C is a perspective bottom view of the stopper rubber 80. FIG. 7A is a sectional view of the stopper rubber 80 taken along the VIIa-VIIa line in FIG. 6A, and FIG. 7B is a sectional view of the stopper rubber 80 taken along the VIIb-VIIb line in FIG. 6A.

As shown in FIG. 6 and FIG. 7, the stopper rubber 80 includes an inner fitting portion 81 opening at both ends and having an inner side into which the connecting member 30 is inserted, and a mounted portion 85 provided to continue with the inner fitting portion 81 and mounted on the upper surface of the connecting member 30. On an upper surface (the upper side in FIG. 7A) side of an inner surface, the inner fitting portion 81 is famed with engaging protrusions 82 protruding downward. On a lower surface (downward in FIG. 7A) side, the inner fitting portion 81 is constituted by a lower plate portion 89 of a flat-plate shape. At the lower plate portion 89, there are protruded a first protrusion 83 protruding downward, a second protrusion 84 protruding downward in a smaller protruding dimension than the first protrusion 83, and a third protrusion 88 protruding upward.

On the upper surface (the upper side surface in FIG. 7A) of the lower plate portion 89, a recess groove recessed in almost a U-shape in section extends in the longitudinal direction of the stopper rubber 80 from an outer edge on one side to an outer edge in the other side. The recess groove is a portion through which the extending protrusion 37 of the connecting member 30 pierces (refer to FIG. 9), and is formed to have an inner shape corresponding to the outer shape of the extending protrusion 37.

The mounted portion 85 is one for obtaining a shock absorbing effect in abutment on the inner surface of the displacement restriction member 70 when displacement takes place in the rebound direction as mentioned before, and is famed into a plate shape with a fixed thickness. Further, the mounted portion 85 has an external shape as viewed from above which is formed to be almost the same shape as the one side of the connecting member 30, and covers the whole of the upper surface of the connecting member 30. The mounted portion 85 is famed with a through hole 86 of a circular shape as viewed from the above at a position corresponding to the receiving recess 32 of the connecting member 30.

The hook portion 87 bent and protruding downward is famed at the outer edge of the mounted portion 85 and at an end portion on the opposite side to the inner fitting portion 81 in the longitudinal direction of the stopper rubber 80. The hook portion 87 is famed at a center portion thereof with a hole being rectangular as viewed from the front to pierce therethrough, and the inner shape of the hole is formed to be almost the same as the outer shape of the protrusion 38 of the connecting member 30.

The engaging protrusions 82 are regions for positioning the stopper rubber 80 relative to the connecting member 30 and are provided to extend in a direction perpendicular to the longitudinal direction (the right-left direction in FIG. 6A) of the stopper rubber 80. The outer shape of the engaging protrusions 82 is famed to be almost the same as the outer shape of the engagement recesses 34 (refer to FIG. 4A and FIG. 5B) of the connecting member 30. Therefore, in attaching the stopper rubber 80 to the connecting member 30, it is possible to position the stopper rubber 80 relative to the connecting member 30 with the engaging protrusions 82 inserted into the engagement recesses 34.

The first protrusion 83 is formed into an arc shape as viewed from the bottom whose axis is coaxial with the circular through hole 86, and is formed to be divided into two at a center position in the circumferential direction. Like the first protrusion 83, the second protrusion 84 is famed into an arc shape as viewed from the bottom whose axis is coaxial with the circular through hole 86, and is famed to be divided into two at a center position in the circumferential direction with a predetermined distance from the first protrusion 83. The third protrusion 88 is famed to protrude on the side opposite to the first protrusion 83 in the vertical direction. That is, the first protrusion 83 and the third protrusion 88 are formed at positions overlapping with each other when the stopper rubber 80 is viewed from the bottom (as viewed vertically in FIG. 7B).

Incidentally, the lower plate portion 89 is formed behind the third protrusion 88 (the left side in FIG. 7A and FIG. 7B) with a portion (area) where the third protrusion 88 is not formed. Therefore, the thickness dimension (the dimension in the vertical direction in FIG. 7A and FIG. 7B) of the lower plate portion 89 becomes the maximum thickness dimension at the portion where the first protrusion 83 and the third protrusion 88 protrude, and becomes the minimum thickness dimension at the portion (the portion viewed in section in FIG. 7A) where the recess groove is provided to be depressed. The portion where the second protrusion 84 protrudes becomes a thickness dimension between the aforementioned maximum and minimum dimensions.

Figure 8A:
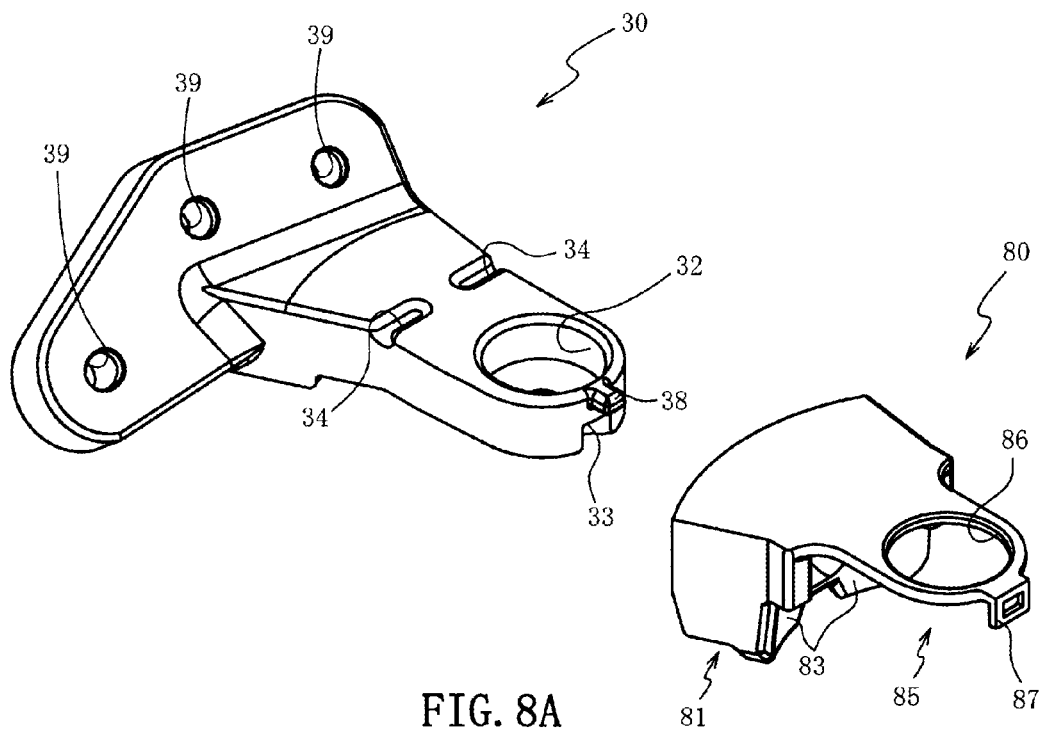
FIG. 8A is a perspective front view of the connecting member and the stopper rubber before the stopper rubber is mounted on the connecting member.
Figure 8B:
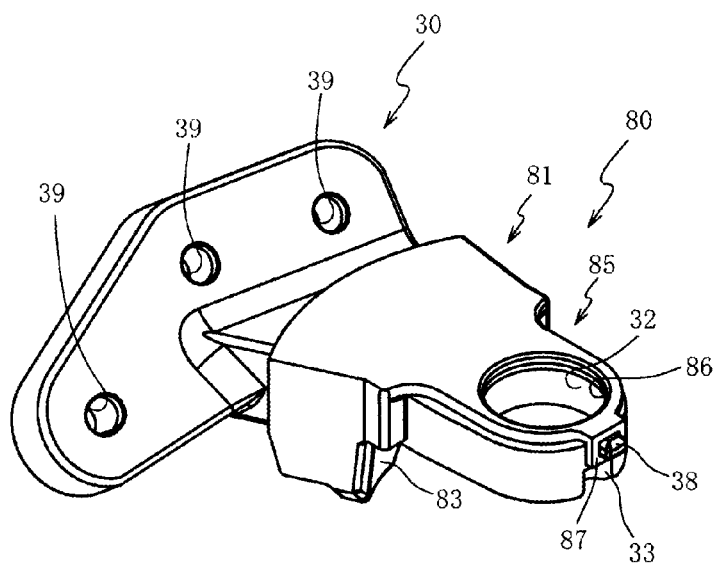
FIG. 8B is a perspective front view of the connecting member and the stopper rubber after the stopper rubber is mounted on the connecting member.

Next, the connecting member 30 and the stopper rubber 80 will be described with reference to FIG. 8 and FIG. 9. FIG. 8A and FIG. 8B are perspective front views of the connecting member 30 and the stopper rubber 80, wherein FIG. 8A shows the state before the stopper rubber 80 is mounted on the connecting member 30, while FIG. 8B shows the state after the stopper rubber 80 is mounted on the connecting member 30.

Figure 9A:
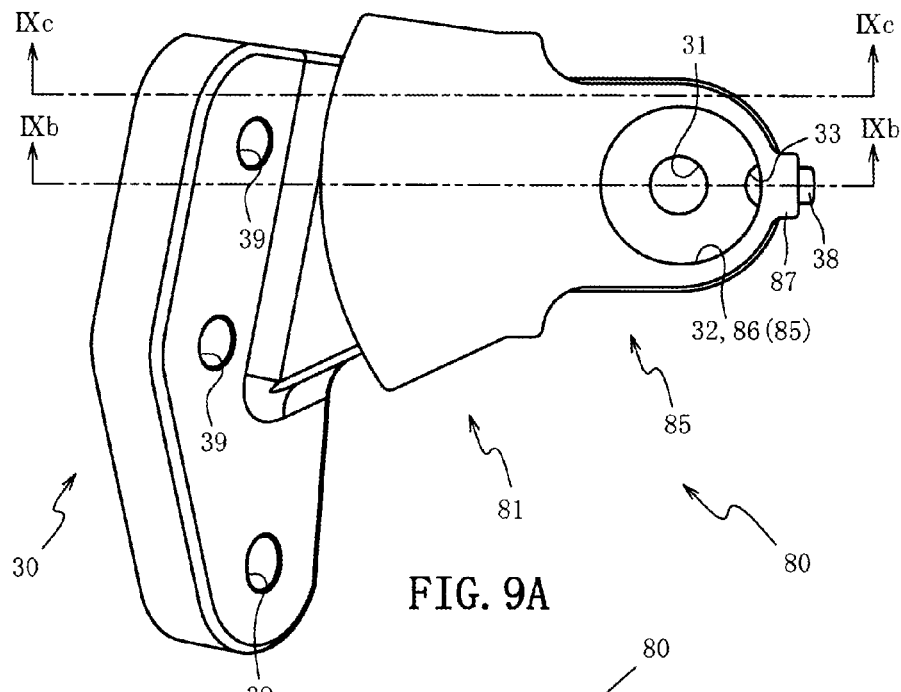
FIG. 9A is a plan view of the connecting member and the stopper rubber.
Figure 9B:
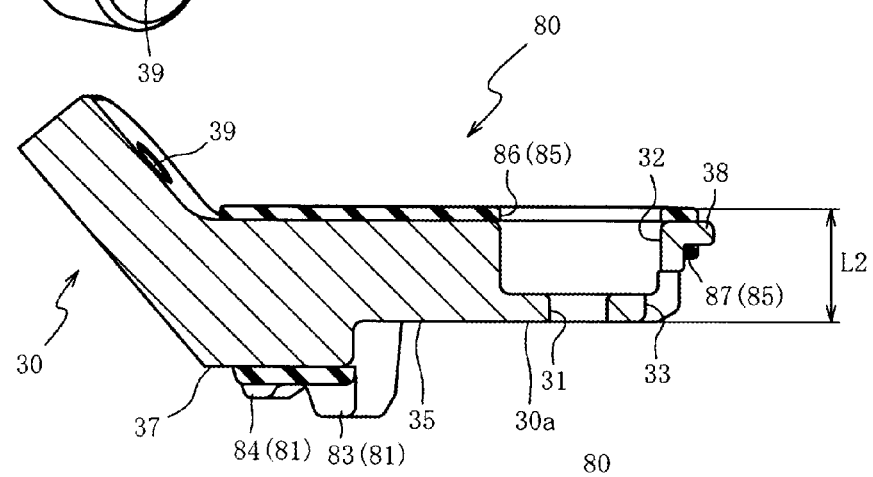
FIG. 9B is a sectional view of the connecting member and the stopper rubber taken along the IXb-IXb line in FIG. 9A.
Figure 9C:
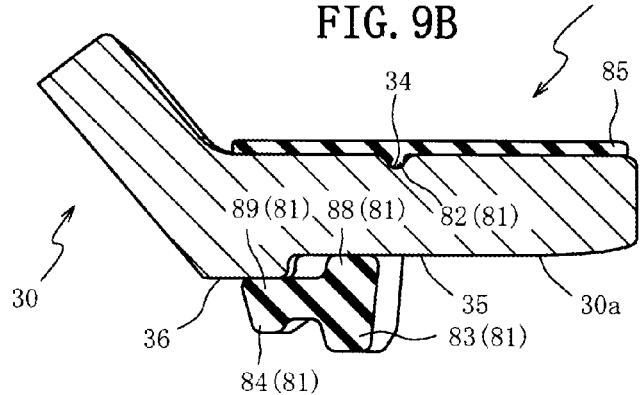
FIG. 9C is a sectional view of the connecting member and the stopper rubber taken along the IXc-IXc line in FIG. 9A.

FIG. 9A is a plan view of the connecting member 30 and the stopper rubber 80, FIG. 9B is a sectional view of the connecting member 30 and the stopper rubber 80 taken along the IXb-IXb line in FIG. 9A, and FIG. 9C is a sectional view of the connecting member 30 and the stopper rubber 80 taken along the IXc-IXc line in FIG. 9A.

As shown in FIG. 8 and FIG. 9, the mounting of the stopper rubber 80 on the connecting member 30 is carried out by inserting the one side of the connecting member 30 into the inner fitting portion 81 of the stopper rubber 80. Such insertion operation results in mounting the mounted portion 85 of the stopper rubber 80 on the one side of the connecting member 30. Incidentally, in the state that the stopper rubber 80 is mounted on the connecting member 30, the thickness dimension of the one side (i.e., the portion inserted into the space between the first attached member 40 and the displacement restriction member 70, refer to FIG. 10B and FIG. 11A) of the connecting member 30 is set to a thickness dimension L2.

When the connecting member 30 has the stopper rubber 80 mounted thereon, the protrusion 38 of the connecting member 30 is inserted inside the hook portion 87 of the stopper rubber 80, and the mounted portion 85 of the stopper rubber 80 is fixed on the upper surface of the connecting member 30. Thus, it is possible to prevent the mounted portion 85 of the stopper rubber 80 from being turned up when the connecting member 30 is inserted between the first attached member 40 and the displacement restriction member 70 (refer to FIG. 10B and FIG. 11A).

In this case, the stopper rubber 80 is famed so that the directions in which the inner fitting portion 81 and the through hole of the hook portion 87 pierce are almost the same as each other. Thus, only by the operation of inserting the connecting member 30 relative to the stopper rubber 80 in one direction from the state shown in FIG. 8A, it is possible to perform at one time (simultaneously) the insertion of the connecting member 30 into the inner fitting portion 81 and the insertion of the protrusion 38 into the hook portion 87 of the stopper rubber 80, as shown in FIG. 8B. Thus, the engagement of the protrusion 38 with the hook portion 87 can be done easily.

Further, since the connecting member 30 is famed at the receding surface 35 to be almost flush with the abutting surface 30a at which the connecting member 30 is fixedly fastened to the first attached member 40, it is possible to insert the connecting member 30 smoothly from the one side into the inner fitting portion 81 of the stopper rubber 80 to the position where the receding surface 35 of the connecting member 30 is inserted in the inner fitting portion 81 of the stopper rubber 80.

When the one side of the connecting member 30 is inserted in the inner fitting portion 81 of the stopper rubber 80, the engaging protrusions 82 of the stopper rubber 80 are inserted into the engagement recesses 34 of the connecting member 30, and the both are engaged. Thus, the insertion position of the stopper rubber 80 relative to the connecting member 30 can be positioned, and the mounting property can be improved. Further, since the engaging protrusions 82 of the stopper rubber 80 are engaged with the engagement recesses 34 of the connecting member 30 in this way, the stopper rubber 80 can be restrained from coming off the connecting member 30.

The connecting member 30 faces the stopper wall portion 11 of the retainer member 10 at its base surface 36, and the gap between the base surface 36 and the stopper wall portion 11 is set as a stopper clearance in the bound direction. In this case, since the base surface 36 is famed with the receding surface 35, it is possible to secure the thickness dimension of the stopper rubber 80 by the amount of the portion (the third protrusion 88) fitted on the receding surface 35 without changing the gap of the connecting member 30 relative to the stopper wall portion 11.

In this case, the lower plate portion 89 of the inner fitting portion 81 of the stopper rubber 80 abuts on the receding surface 35 of the connecting member 30 at the third protrusion 88 and on the base surface 36 of the connecting member 30 at the portion which, of the lower plate portion 89, the third protrusion 88 is not famed. That is, since the first protrusion 83 and the third protrusion 88 are arranged at the position corresponding to the receding surface 35 of the connecting member 30, the thickness dimension (the dimension in the vertical direction in FIG. 9C) of the stopper rubber 80 can be secured by that amount. As a result, it is possible to lower the spring constant exerted when the first protrusion 83 is brought into abutment on the stopper wall portion 11.

Further, since the second protrusion 84 is formed to be shorter in protruding dimension than the first protrusion 83, it is possible to make the gap between the second protrusion 84 and the stopper wall portion 11 larger than the gap between the first protrusion 83 and the stopper wall portion 11 (refer to FIG. 11). Thus, the first protrusion 83 can be made to abut on the stopper wall portion 11 earlier than the second protrusion 84, and hence, the stopper rubber 80 can be made to abut on the stopper wall portion 11 stepwise first at the large thickness portion and then at the small thickness portion. Therefore, it is possible to accomplish a stepwise change wherein the spring constant is lowered at an early stage and hightened at a latter stage.

However, if the connecting member 30 were formed with the receding surface 35 throughout the entire length of the bottom surface in order to secure the thickness dimension of the stopper rubber 80, the connecting member 30 would otherwise be lowered in rigidity. To the contrary, in the present embodiment, since the extending protrusion 37 is famed to protrude from the receding surface 35 and the base surface 36, it can be realized to increase the rigidity of the connecting member 30.

In particular, since the extending protrusion 37 is famed to extend in the longitudinal direction of the one side of the connecting member 30, it is possible to efficiently realize the increase in the rigidity of the connecting member 30 with the area of the receding surface 35 secured.

Incidentally, since the extending protrusion 37 is famed into an almost triangle shape as viewed from the bottom which becomes a protruding shape at a distal end side of the one side, the stopper rubber 80 and the extending protrusion 37 are restrained from interfering with each other when the stopper rubber 80 is mounted on the connecting member 30, and hence, an improvement in the mounting property can be realized.

Further, the provision of the extending protrusion 37 enables the thickness dimension of the stopper rubber 80 to be diminished partly by that amount. Accordingly, it is possible to form the stopper rubber 80 with a large thickness dimension of a region corresponding to the receding surface 35 (the portion corresponding to the first protrusion 83 and the third protrusion 88), a medium thickness dimension of a region corresponding to the base surface 36 (the portion corresponding to the second protrusion 84) and a small thickness dimension of a region corresponding to the extending protrusion 37 (the portion corresponding to the recess groove provided to be depressed on the lower plate portion 89). Accordingly, the spring constant exerted when the stopper rubber 80 abuts on the stopper wall portion 11 can be eased to be changed stepwise.

Further, since the first protrusion 83 is formed as a pair in the width direction of the connecting member 30 with the extending protrusion 37 put therebetween (namely, is famed at positions not overlapping with the extending protrusion 37 as viewed from the bottom) (refer to FIG. 4 to FIG. 7), the first protrusion 83 can be separated from the portion which of the stopper rubber 80, is made to be small in thickness dimension by the protrusive provision of the extending protrusion 37 (from the portion famed with the recess groove of the lower plate portion 89). Thus, the spring constant exerted when the first protrusion 83 abuts on the stopper wall portion 11 can be diminished, and hence, the spring constant can be eased to be changed stepwise.

Next, a manufacturing process of the antivibration device 100 will be described with reference to FIG. 10 and FIG. 11. FIG. 10A is a sectional view of the retainer member 10, the displacement restriction member 70 and the mount body 20, and FIG. 10B is a sectional view of a compact body 101. FIG. 11A is an enlarged fragmentary sectional view of the antivibration device 100 in the state before the bolt 93 is fastened, and FIG. 11B is an enlarged fragmentary sectional view of the antivibration device 100 in the state after the bolt 93 is fastened.

As shown in FIG. 10A and FIG. 10B, in the manufacturing of the antivibration device 100, first of all, the retainer member 10 and the displacement restriction member 70 are integrally joined by welding, and the mount body 20 is press-fitted from the lower opening of the retainer member 10 to a predetermined press-fitting position to constitute the compact body 101. Incidentally, in the present embodiment, the predetermined press-fitting position is set as the position where the upper end surface of the second attached member 50 in the mount body 20 agrees with the upper surface of the stopper wall portion 11. However, such predetermined press-fitting position can be set discretionarily.

Here, the distance dimension D1 from the upper end surface of the second attached member 50 to the upper end surface of the covering rubber portion 61 in the mount body 20 is set to be a larger distance dimension than the distance dimension D2 from the upper end bottom surface of the displacement restriction member 70 to the upper end surface of the retainer member 10 (the stopper wall portion 11) (D2<D1).

Therefore, when the compact body 101 is constituted, the upper end surface of the upright portion 42 is thrusted against the upper end bottom surface of the displacement restriction member 70 with the covering rubber portion 61 therebetween, whereby the antivibration base body 60 is compressed in the axial direction. Thus, it is possible to give the antivibration base body 60 precompression.

Further, the first attached member 40 of the mount body 20 has the upright portion 42 upstanding from the upper surface. Thus, since the upright portion 42 is interposed between the first attached member 40 and the displacement restriction member 70, it is possible to define a space of a distance dimension L1 between the upper surface of the first attached member 40 (the seat surface on which the connecting member 30 abuts) and the upper end bottom surface of the displacement restriction member 70.

After the compact body 101 is constituted as shown in FIG. 10B, the connecting member 30 with the stopper rubber 80 mounted thereon is inserted as shown in FIG. 11A from its one side into the space between the upper surface of the first attached member 40 and the upper end bottom surface of the displacement restriction member 70.

In this case, the distance dimension L1 from the upper surface of the first attached member 40 to the upper end bottom surface of the displacement restriction member 70 is made to be larger than the thickness dimension L2 (refer to FIG. 9B) on the one side of the connecting member 30 in the state of the stopper rubber 80 mounted. As a result, after the press-fitting step of press-fitting the mount body 20 in the retainer member 10 is completed, the operation can be carried out to insert the one side of the connecting member 30 between the first attached member 40 and the displacement restriction member 70, so that the manufacturing process can be simplified. Further, as mentioned earlier, the dimension W1 (refer to FIG. 4A) in the width direction on the one side of the connecting member 30 is formed to be equal to or slightly smaller than the face-to-face distance dimension W2 of the covering rubber portions 61 which are provided to cover the inside surfaces of the facing walls 42b of the upright portion 42 of the first attached member 40. Thus, it is possible to insert the connecting member 30 along the facing walls 42b and hence, the workability for insertion can be improved since the insertion can be regulated.

Further, the upright portion 42 has the abutting wall 42a connected to the facing walls 42b, and thus, this configuration enables the upright portion 42 to be heightened in rigidity. Therefore, the upright portion 42 can be prevented from being damaged when the one side of the connecting member 30 is inserted between the first attached member 40 and the displacement restriction member 70. That is, the upright portion 42 can be effectively heightened in rigidity by the good use of the limited space around the connecting member 30.

After the one side of the connecting member 30 is thrusted into the space between the first attached member 40 and the displacement restriction member 70 as shown in FIG. 11A, the bolt 93 inserted through the insertion hole 72 of the displacement restriction member 70 is threadedly engaged with the female screw portion 43 of the first attached member 40 through the fastening hole 31 of the connecting member 30. Thus, the connection member 30 and the first attachment member 40 are fastened to constitute the antivibration device 100.

Incidentally, in this completed state, the distance dimension between the upper end bottom surface of the displacement restriction member 70 and the upper surface of the upright portion 42 is famed to be larger than the distance dimension between the upper surface on the one side of the connecting member 30 and the upper end bottom surface of the displacement restriction member 70 (refer to FIG. 2A). That is, the upper end surface on the one side of the connecting member 30 is located to be higher (on the upper side in FIG. 2A) than the upper end surface of the upright portion 42 of the first attached member 40. Thus, the load exerted when the displacement restriction member 70 catches the displacement in the rebound direction to operate as a stopper can be undertaken mainly by the one side of the connecting member 30. Therefore, since the load can be received by a larger area than the upper surface of the upright portion 42, the damage of the upright portion 42 can be prevented. This enables the upright portion 42 to take a shape being relatively low in rigidity, so that the manufacturing cost can be reduced.

Next, the relation of the connecting member 30 to the first attached member 40 will be described with reference to FIG. 12. FIG. 12A is a plan view of the antivibration device 100 in the state that the displacement restriction member 70 and the bolt 93 are removed, FIG. 12B is an enlarged fragmentary view of the antivibration device 100 at the XIIb portion in FIG. 12A, and FIG. 12C is an enlarged fragmentary sectional view of the antivibration device 100 at the XIIc portion in FIG. 11A.

As shown in FIG. 12A, the distal end on the one side of the connecting member 30 is famed to take the outer shape as viewed from above being almost the same as the outer shape of the abutting wall 42a of the upright portion 42, and when the connecting member 30 is inserted into the space between the first attached member 40 and the displacement restriction member 70, the one side of the connecting member 30 guided by the facing walls 42b is brought into abutment on the abutting wall 42a of the upright portion 42, whereby the positioning in the insertion direction can be made. Thanks to the positioning in the insertion direction and the positioning by the pair of facing walls 42b in a direction orthogonal to the insertion direction, the position of the fastening hole 31 of the connecting member 30 can be aligned with the female screw portion 43 of the first attached member 40, so that the fastening of the bolt 93 can be done easily.

That is, only by performing the operation that inserts the connecting member 30 into the space between the first attached member 40 and the displacement restriction member 70 to an insertable position (a position at which the insertion is restricted), it is possible to perform the aligning of the position of the fastening hole 31 relative to the female screw portion 43 at the same time, and thus, it is not required to separately perform the operation to align the position of the fastening hole 31 relative to the female screw portion 43. Therefore, the workability can be improved by that degree.

As shown in FIG. 12B, when the connecting member 30 is inserted into the space between the first attached member 40 and the displacement restriction member 70, the protrusion 38 of the connecting member 30 is inserted (internally fitted) inside the receiving portion 45 famed at the upright portion 42 of the first attached member 40. Thus, since the connecting member 30 can be positioned relative to the first attached member 40, it is possible to heighten the positioning accuracy of the fixedly fastened position of the connecting member 30 relative to the first attached member 40. Further, since the protrusion 38 has been internally fitted in the receiving portion 45 when the connecting member 30 is fixedly fastened to the first attached member 40, these first attached member 40 and connecting member 30 can be restrained from being relatively rotated by the fastening torque. Therefore, the protrusion 38 of the connecting member 30 is enabled to play a role of being engaged with the hook portion 87 of the stopper rubber 80 and another role of being engaged with the receiving portion 45 of the first attached member 40. Therefore, it is not necessary to form as separate members a member for enabling the connecting member 30 and the stopper rubber 80 to be engaged and a member for enabling the connecting member 30 and the first attached member 40 to be engaged (namely, to form respective members at respective positions), and hence, the structure can be simplified.

As shown in FIG. 12C, when the protrusion 38 of the connecting member 30 is inserted into the receiving portion 45 of the first attached member 40, the hook portion 87 is put between the connecting member 30 and the upright portion 42 (the abutting wall 42a). In this case, the gap between the bottom surface of the protrusion 38 and the bottom surface (the surface facing the protrusion 38) of the first groove 47 is made to be smaller than the thickness dimension (the dimension in the vertical direction in FIG. 12C) of the hook portion 87. Thus, since it is possible to restrain the hook portion 87 of the stopper rubber 80 from being displaced in a direction to release the engagement with the protrusion 38 of the connecting member 30 (rightward in FIG. 12C), the hook portion 87 can be restrained from coming off the protrusion 38.

Further, in the state that the protrusion 38 is inserted into the receiving portion 45, the communication aperture 33 of the connecting member 30 and the receiving portion 45 of the first attached member 40 are disposed at positions to become the same phase, and the communication aperture 33 can be made to face the slit of the receiving portion 45. Therefore, water drained from the communication aperture 33 can be smoothly drained outside the antivibration device 100 through the receiving portion 45.

Figure 13A:
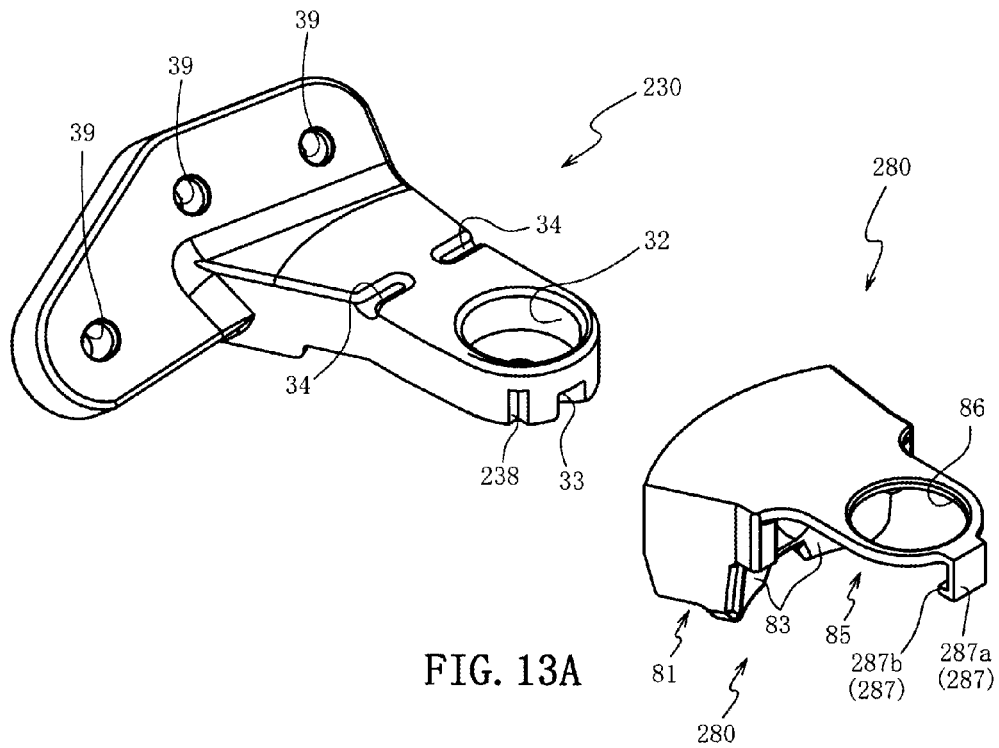
FIG. 13A is a perspective front view of a connecting member and a stopper rubber in the state before the stopper rubber is mounted on the connecting member in a second embodiment.
Figure 13B:
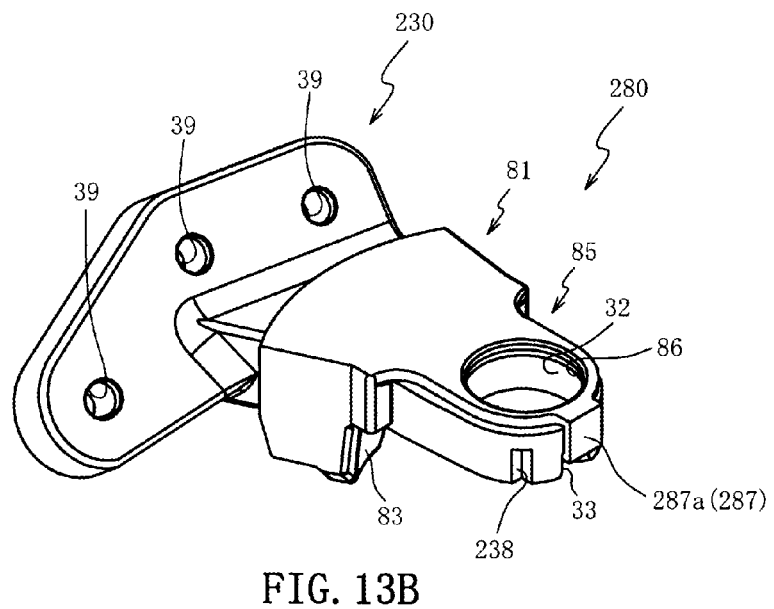
FIG. 13B is a perspective front view of the connecting member and the stopper rubber in the state after the stopper rubber is mounted on the connecting member.
Figure 14A:
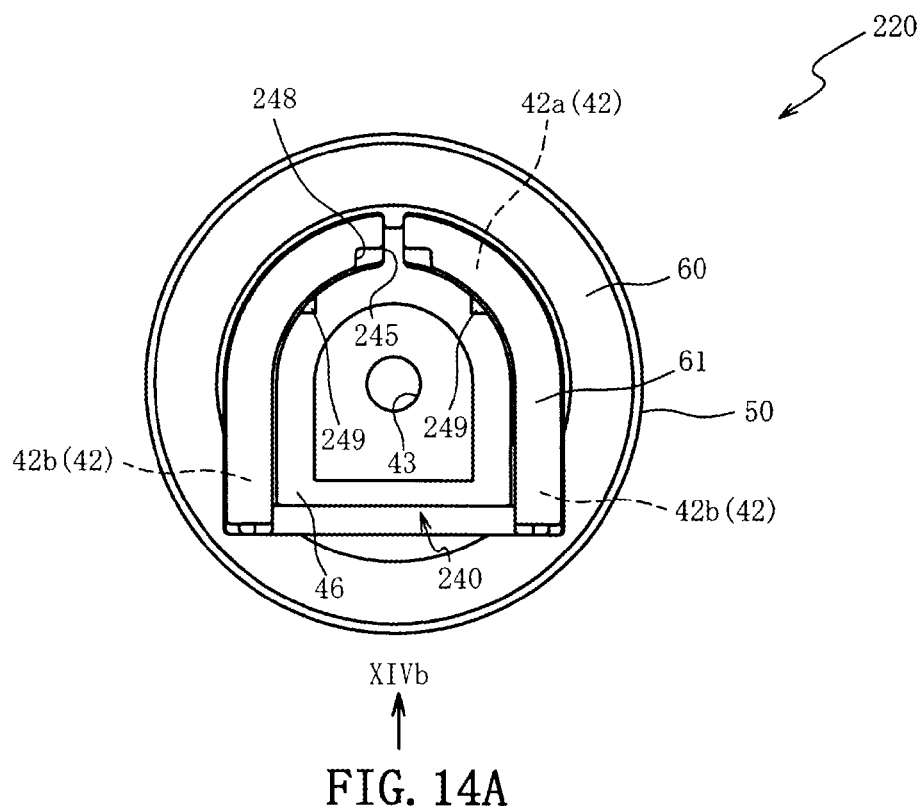
FIG. 14A is a plan view of a mount body and a retainer member.
Figure 14B:
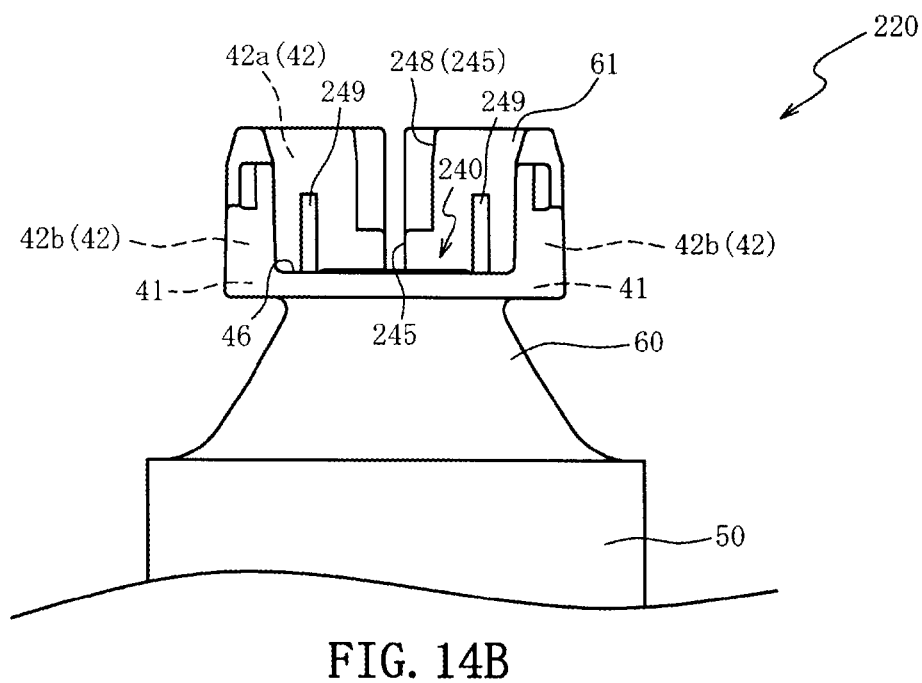
FIG. 14B is a side view of the mount body as viewed in the XIVb direction in FIG. 14A.

Next, an antivibration device in a second embodiment will be described with reference to FIG. 13 and FIG. 14. FIG. 13A and FIG. 13B are perspective front views of a connecting member 230 and a stopper rubber 280 in the second embodiment, wherein FIG. 13A shows a state before the stopper rubber 280 is mounted on the connecting member 230, while FIG. 13B shows a state after the stopper rubber 280 is mounted on the connecting member 230. FIG. 14A is a plan view of a mount body 220 and the retainer member 10, and FIG. 14B is a side view of the mount body 220 as viewed in the XIVb direction in FIG. 14A. Incidentally, the same portions as those in the first embodiment will be given the same reference signs and will be omitted from being described.

As shown in FIG. 13A, on the connecting member 230 of the antivibration device in the second embodiment, recessed portions 238 are provided to be depressed at two places on a lateral surface of a distal end side curved portion on the one side. The recessed portions 238 are recess grooves for receiving protrusions 249 referred to later, and on the lateral surface of the connecting member 230, are linearly extended in the axial direction from almost a center position in the height direction to the bottom surface.

Further, a hook portion 287 of the stopper rubber 280 is famed to be bent to an L-shape in section and is constituted by a suspended portion 287a suspended downward from the distal end side of the mounted portion 85 and an engaged portion 287b protruding inward from the distal end side of the suspended portion 287a, the engaged portion 287b being engageable with the inner surface of the communication aperture 33 of the connecting member 230.

As shown in FIG. 13B, the mounting of the stopper rubber 280 on the connecting member 230 is carried out by inserting the one side of the connecting member 230 into the inner fitting portion 81 of the stopper rubber 280. When the connecting member 230 is fitted in the stopper rubber 280, the engaged portion 287b of the stopper rubber 280 is engaged with the communication aperture 33 of the connecting member 230, whereby the mounted portion 85 of the stopper rubber 280 is fixed on the upper surface of the connecting member 230. Thus, it is possible to prevent the mounted portion 85 of the stopper rubber 280 from being turned up when the connecting member 230 is inserted between a first attached member 240 and the displacement restriction member 70 (refer to FIG. 11).

As shown in FIG. 14A and FIG. 14B, on the first attached member 240, protrusions 249 each protruding toward the facing walls 42b side (downward in FIG. 14A) from the inner peripheral surface of the abutting wall 42a famed into arc shape as viewed from above are provided to descend from almost a center portion in the vertical direction (the vertical direction in FIG. 14B) of the upright portion 42 to the base portion of the upright portion 42, the protrusions 249 each being almost a triangle shape as viewed from above. The protrusions 249 are famed at positions corresponding to the aforementioned recessed portions 238 of the connecting member 230 and are inserted into the recessed portions 238 to be engaged with the same when the one side of the connecting member 230 is inserted into the space between the first attached member 240 and the displacement restriction member 70. Incidentally, the protrusions 249 are famed in the state (exposed state) that distal ends thereof protrude from the covering rubber portion 61 covering the upright portion 42.

Therefore, when the one side of the connecting member 230 is inserted into the space between the first attached member 240 and the displacement restriction member 70, the protrusions 249 are engaged with the recessed portions 238, so that the connecting member 230 can be positioned relative to the first attached member 240. Accordingly, it is possible to enhance the positioning accuracy of the fixedly fastened position of the connecting member 230 relative to the first attached member 240. Further, in fixedly fastening the connecting member 230 to the first attached member 240, the protrusions 249 have been inserted into (engaged with) the recessed portions 238, and thus, it is possible to restrain the first attached member 240 and the connecting member 230 from being relatively rotated by the fastening torque.

Further, the abutting wall 42a of the first attached member 240 is famed at a center portion in the circumferential direction with a slit-like receiving portion 245 opening from the axial upper end to the base portion. The receiving portion 245 is famed on the upper side (the upper side in FIG. 14B) with a second groove 248 which, on the radial inside of the abutting wall 42a, opens to be wider than the receiving portion 245 in a direction orthogonal to the axis (the right-left direction in FIG. 14A).

The second groove 248 is a portion where the suspended portion 287a of the hook portion 287 of the stopper rubber 280 is disposed inside in the state that the one side of the connecting member 230 is inserted into the space between the first attached member 240 and the displacement restriction member 70. The second groove 248 is famed to have an inside shape which is equivalent to or slightly larger than the outer shape of the suspended portion 287a.

Therefore, when the one side of the connecting member 230 is inserted into the space between the first attached member 240 and the displacement restriction member 70, the suspended portion 287a of the hook portion 287 is put between the connecting member 230 and the upright portion 42 (the portion of the abutting wall 42a defining the second groove 248). In this case, the protruding dimension of the engaged portion 287b of the hook portion 287 is larger than the dimension of the gap between the connecting member 230 and the upright portion 42 (the portion of the abutting wall 42a defining the second groove 248). Accordingly, since the engaged portion 287b of the hook portion 287 of the stopper rubber 280 can be restrained from being displaced in a direction to be released from the engagement with the communication aperture 33 of the connecting member 230, it is possible to restrain the hook portion 287 from coming off the communication aperture 33.

Hereinabove, the present invention has been described based on the embodiments. However, the present invention is not in any way limited to the foregoing embodiments, and it can easily be inferred that various modifications are possible without departing from the gist of the present invention.

In the foregoing respective embodiments, description has been made regarding the example wherein the upright portion 42 of the first attached member 40, 240 is integrally famed into almost a U-shape as viewed from above. However, the upright portion 42 is not necessarily limited to the example and may be one wherein the facing walls 42b for guiding the insertion of the connecting member 30, 230 are famed to be spaced from the abutting wall 42a on which the distal end of the connecting member 30, 230 is brought into abutment (that is, one wherein slit-like gaps are famed between the abutting wall 42a and the facing walls 42b).

In the foregoing respective embodiments, description has been made regarding the example wherein the upright portion 42 of the first attached member 40, 240 is formed integrally with the receiving portion 41. However, the upright portion 42 is not necessarily limited to the example and may be one wherein the upright portion 42 is famed as a separate member and is fixed to the receiving portion 41 by fixing method (for example, welding, protrusion-recess fitting (press-fitting), and fastening by screws).

In the foregoing respective embodiments, description has been made regarding the example wherein the upright portion 42 is famed on the first attached member 40, 240. However, the upright portion 42 is not necessarily limited to the example. The forming of the upright portion 42 on the first attached member 40, 240 may be omitted, or in addition to the forming of the upright portion 42 on the first attached member 40, 240, a structure corresponding to the upright portion 42 (namely, a region for defining the space of the distance dimension L1 which enables the connecting member 30, 230 to be inserted between the first attached member 40, 240 and the displacement restriction member 70) may be provided on the displacement restriction member 70.

In the foregoing respective embodiments, description has been made regarding the example wherein the first protrusion 83 and the second protrusion 84 are protruded with a space from the bottom surface of the inner fitting portion 81 (the lower plate portion 89) of the stopper rubber 80. However, this configuration is not necessarily limited to the example and may be one wherein the first protrusion 83 and the second protrusion 84 are provided to be continued. That is, there may be taken one wherein a stair shape is defined by the lower plate portion 89, the first protrusion 83 and the second protrusion 84.

In the foregoing respective embodiments, description has been made regarding the example wherein the first protrusion 83, the second protrusion 84 and the third protrusion 88 are each formed to be divided into two at the center portion in the circumferential direction. However, this configuration is not necessarily limited to the example and may be one wherein these first protrusion 83, second protrusion 84 and third protrusion 88 are each defined without being divided at the center portion in the circumferential direction.

The hook member 87 in the foregoing first embodiment may include the engaged portion 287b in the foregoing second embodiment, in which case the protrusion 38 may be inserted into the opening of the hook portion 87 and the engaged portion 287b may be engaged with the inner surface of the communication aperture 33 of the connecting member 30. Thus, it can be avoided further reliably that the engagement of the hook portion 87 is released.

In the foregoing first embodiment, description has been made regarding the example wherein the protrusion 38 and the receiving portion 45 are formed respectively on the connecting member 30 and the first attached member 40 (the upright portion 42). However, this configuration is not necessarily limited to the example and may be opposite in arrangement. That is, the receiving portion 45 may be depressed or formed to be opened in a slit shape on the outer peripheral surface of the connecting member 30, while the protrusion 38 may be protruded from the inner peripheral surface of the upright portion 42.

In the foregoing second embodiment, description has been made regarding the example wherein the recessed portions 238 and the protrusions 249 are famed respectively on the connecting member 230 and the first attached member 240 (the abutting wall 42a). However, this configuration is not necessarily limited to the example and may be opposite in arrangement. That is, the protrusions 249 may be protruded from the outer peripheral surface of the connecting member 230, while the recessed portions 238 may be depressed on the inner peripheral surface of the abutting wall 42a.

The invention claimed is:

1. An antivibration device comprising:
a mount body having a first attached member attached to a vibration source side, a second attached member attached to a vehicle body frame side, and an antivibration base body formed of a rubber elastic body and interconnecting the first attached member and the second attached member;
a connecting member fixedly fastened on one side to the first attached member and fixedly fastened on the other side to the vibration source side;
a retainer member retaining the second attached member; and
a displacement restriction member disposed on the retainer member and surrounding the one side of the connecting member, the displacement restriction member being formed with an insertion hole for enabling a bolt to pierce which fixedly fastens the connecting member to the first attached member, wherein
the first attached member includes an upright portion upstanding toward the displacement restriction member,
when the second attached member is retained on the retainer member with the antivibration base body being precompressed, the interposition of the upright portion enables a space into which the one side of the connecting member is insertable, to be formed between the first attached member and the displacement restriction member, and
in the state that the one side of the connecting member is fixedly fastened to the first attached member, a gap between the upright portion and the displacement restriction member is set to a larger dimension than a gap between the connecting member and the displacement restriction member.

2. The antivibration device according to claim 1, further comprising a covering rubber portion formed of a rubber elastic body connected to the antivibration base body and covering at least an upright end surface of the upright portion.

3. The antivibration device according to claim 1, wherein
the upright portion includes an abutting wall on which an inserted distal end side of the connecting member inserted into the space between the first attached member and the displacement restriction member is brought into abutment, and
when the inserted distal end side of the connecting member is brought into abutment on the abutting wall, the connecting member is disposed at a position being able to be fastened relative to the first attached member.

4. The antivibration device according to claim 3, further comprising:
a protrusion protruding from one of the inserted distal end side of the connecting member and the abutting wall; and
a receiving portion formed on the other of the inserted distal end side of the connecting member and the abutting wall for receiving the protrusion to be engaged,
wherein when the inserted distal end side of the connecting member is brought into abutment on the abutting wall, the protrusion is received in the receiving portion, and the connecting member is positioned relative to the first attached member.

5. The antivibration device according to claim 4, wherein the upright portion includes a pair of facing walls disposed to face lateral surfaces of the connecting member inserted into the space between the first attached member and the displacement restriction member.

6. The antivibration device according to claim 5, wherein the upright portion has the abutting wall connected to the facing walls.

7. The antivibration device according to claim 4, further comprising:
a stopper rubber formed of a rubber elastic body and mounted on the connecting member, wherein
the protrusion is protruded from the inserted distal end side of the connecting member and the receiving portion is formed on the abutting wall, and
the stopper rubber includes a hook portion formed to be engageable with the protrusion.

8. The antivibration device according to claim 7, wherein the hook portion is put between the connecting member and the abutting wall.

9. An antivibration device comprising:
a mount body having a first attached member attached to a vibration source side, a second attached member attached to a vehicle body frame side, and an antivibration base body formed of a rubber elastic body and interconnecting the first attached member and the second attached member;
a connecting member fixedly fastened on one side to the first attached member and fixedly fastened on the other side to the vibration source side;
a retainer member retaining the second attached member; and a displacement restriction member disposed on the retainer member and surrounding the one side of the connecting member, the displacement restriction member being formed with an insertion hole for enabling a bolt to pierce which fixedly fastens the connecting member to the first attached member, wherein the first attached member includes an upright portion upstanding toward the displacement restriction member, when the second attached member is retained on the retainer member with the antivibration base body being precompressed, the interposition of the upright portion enables a space into which the one side of the connecting member is insertable, to be formed between the first attached member and the displacement restriction member, wherein the upright portion includes an abutting wall on which an inserted distal end side of the connecting member inserted into the space between the first attached member and the displacement restriction member is brought into abutment, and when the inserted distal end side of the connecting member is brought into abutment on the abutting wall, the connecting member is disposed at a position being able to be fastened relative to the first attached member.

10. The antivibration device according to claim 9, further comprising a covering rubber portion formed of a rubber elastic body connected to the antivibration base body and covering at least an upright end surface of the upright portion.

11. The antivibration device according to claim 10, wherein in the state that the one side of the connecting member is fixedly fastened to the first attached member, a gap between the upright portion and the displacement restriction member is set to a larger dimension than a gap between the connecting member and the displacement restriction member.

12. The antivibration device according to claim 9, further comprising:

a protrusion protruding from one of the inserted distal end side of the connecting member and the abutting wall; and a receiving portion formed on the other of the inserted distal end side of the connecting member and the abutting wall for receiving the protrusion to be engaged, wherein when the inserted distal end side of the connecting member is brought into abutment on the abutting wall, the protrusion is received in the receiving portion, and the connecting member is positioned relative to the first attached member.

13. The antivibration device according to claim 12, wherein the upright portion includes a pair of facing walls disposed to face lateral surfaces of the connecting member inserted into the space between the first attached member and the displacement restriction member.

14. The antivibration device according to claim 13, wherein the upright portion has the abutting wall connected to the facing walls.

15. The antivibration device according to claim 12, further comprising:

a stopper rubber formed of a rubber elastic body and mounted on the connecting member, wherein the protrusion is protruded from the inserted distal end side of the connecting member and the receiving portion is formed on the abutting wall, and the stopper rubber includes a hook portion formed to be engageable with the protrusion.

16. The antivibration device according to claim 15, wherein the hook portion is put between the connecting member and the abutting wall.

* * * * *